(12) United States Patent
Spielberg et al.

(10) Patent No.: US 8,091,028 B2
(45) Date of Patent: *Jan. 3, 2012

(54) METHOD AND APPARATUS FOR ANNOTATING A LINE-BASED DOCUMENT

(75) Inventors: Steven Spielberg, Los Angeles, CA (US); Samuel Gustman, Santa Monica, CA (US)

(73) Assignee: Copernicus Investments, LLC, Los Angeles, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 12/395,265

(22) Filed: Feb. 27, 2009

(65) Prior Publication Data

US 2009/0228126 A1 Sep. 10, 2009

Related U.S. Application Data

(63) Continuation of application No. 11/207,598, filed on Aug. 18, 2005, now Pat. No. 7,500,193, which is a continuation-in-part of application No. 09/802,395, filed on Mar. 9, 2001, now Pat. No. 7,366,979.

(51) Int. Cl.
*G06F 17/00* (2006.01)

(52) U.S. Cl. ........ 715/728; 715/716; 715/727; 709/206; 709/219; 709/232

(58) Field of Classification Search .................. 715/230, 715/255, 728, 762
See application file for complete search history.

(56) References Cited

U.S. PATENT DOCUMENTS

| | | | |
|---|---|---|---|
| 5,732,216 A * | 3/1998 | Logan et al. | 709/203 |
| 7,500,193 B2 * | 3/2009 | Spielberg et al. | 715/727 |
| 2005/0096909 A1 * | 5/2005 | Bakis et al. | 704/260 |

* cited by examiner

*Primary Examiner* — Quoc A Tran
(74) *Attorney, Agent, or Firm* — The Hecker Law Group, PLC

(57) ABSTRACT

To facilitate the use of audio files for annotation purposes, an audio file format, which includes audio data for playback purposes, is augmented with a parallel data channel of line identifiers, or with a map associating time codes for the audio data with line numbers on the original document. The line number-time code information in the audio file is used to navigate within the audio file, and also to associate bookmark links and captured audio annotation files with line numbers of the original text document. An annotation device may provide an output document wherein links to audio and/or text annotation files are embedded at corresponding line numbers. Also, a navigation index may be generated, having links to annotation files and associated document line numbers, as well as bookmark links to selected document line numbers.

29 Claims, 27 Drawing Sheets

FIGURE 24

METHOD AND APPARATUS FOR ANNOTATING A LINE-BASED DOCUMENT

CROSS-REFERENCES TO RELATED APPLICATIONS

This application is a continuation of U.S. patent application Ser. No. 11/207,598, filed Aug. 18, 2005 now U.S. Pat. No. 7,500,193, which is continuation-in-part of U.S. patent application Ser. No. 09/802,395, filed on Mar. 9, 2001, which issued as U.S. Pat. No. 7,366,979 on Apr. 29, 2008, the specifications and figures of all of which are incorporated by reference herein.

FIELD OF THE INVENTION

This invention relates to the field of computer technology. More specifically, the invention relates to a method and apparatus for performing document annotation.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

Writing a screenplay, a book, or any other document is a process that usually requires a significant time investment from the people responsible for producing such a document. The quality and value of the document that is ultimately generated typically increases when multiple people have had the opportunity to review and comment on the document. As a result, the process of reviewing documents is tightly integrated into many aspects of modern business.

The first draft of a document often contains mistakes or other problems that should be corrected. These issues are typically resolved during the review process. Anybody that can provide valuable input about the document may contribute to the review process. During this process, the reviewer may, for example, wish to provide input about the contents of the document by giving comments, feedback, and/or making changes to the text of the document. In some instances entire portions of the document are deleted or rewritten. In other instances, portions of the document are simply critiqued. The document that is ultimately produced when the review process is complete may be very different from the document that existed in first draft form. Thus, the review process is a valuable step in the process of finalizing a document.

Since the people who are largely responsible for reviewing documents often have a schedule that keeps them moving from one meeting to another, there is a need for a device that simplifies the review process by allowing a reviewer to interact with the document while on the move. For example, current systems do not allow the reviewer to access and verbally comment on a document from multiple locations. A reviewer cannot use current systems to begin reviewing a document from a cell phone in the reviewer's car, continue to review the same document from a home PC, and finish reviewing the document from a pay phone.

Current systems also do not provide the reviewer with an intuitive way to verbally interact with the document. Most systems for reviewing documents are text-based and do not have the ability to read the document to the reviewer so that the reviewer can hear the contents of the document. Moreover, these text-based systems do not provide a way to record verbal comments provided by the reviewer while the document is being read. These limitations become particularly evident when the document being reviewed is a movie script or some other kind of document where it is important for the reviewer to hear the words contained in the document.

So that the reader can better understand the advances in the art made by embodiments of the invention, a brief discussion of several current systems for editing and/or commenting about a document follows. Some text-based systems (e.g., word processors) provide a way for reviewers to comment on a document by manually typing an entry into a comment field. Comments can also be recorded in a sound file and manually associated with the document. However, this process is laborious and does not provide the reviewer with a way to easily hear and comment upon a document.

Some word processing programs (e.g., Microsoft Word™) have a built in mechanism for inserting comments into a document. This mechanism does not provide reviewers with a way to listen to audio output associated with the contents of a text document. Nor do such programs allow the reviewer to provide input about the document by speaking to the word processing program. However, such word processing programs do supply reviewers with a way to manually insert typed comments into a text document.

FIG. 1 illustrates a word processing program configured to insert comments into a document. Word processing program 100 contains an instance of document 112 containing text about which the user of the program may comment. If the user wishes to comment on sentence 104, the user may insert comments into the document by utilizing a pointing device (e.g., a mouse) to highlight the text that is to be associated with the comment. Once the text is selected the user inputs the comments via an input device such as a computer keyboard. The comments are typically entered in a comment region 102 that consists of a list of one or more comments associated with document 112.

The user who authored the comment is identified in an abbreviated manner in a location related to the comment. User ID 110, for example, indicates that a user having a username (e.g., user1:jake_smyth) is associated with comment 108. Comment 108 may exist as a textual comment or as an audio file. If a verbal comment was recorded and associated with document 112, the user may elect to listen to the verbal comment by selecting icon 106. Upon selection of icon 106, audio player 112 plays the audio file containing the stored version of the verbal comment. In some word processing programs, the text that is related to comment 104 is highlighted with a color that indicates a comment was made about that portion of text.

Although word processing programs provide a built-in mechanism for typing comments into a document such programs do not provide a way to insert comments into the document from a place other than the program itself. For example, a user cannot comment about the document unless the user is utilizing the word processing program and has a copy of the document on-hand. Thus, there is a need for a method and apparatus that complements existing word processing programs by providing users with alternative avenues for editing or commenting on a document while on the move. Moreover, such word processing program lack an efficient way to store and easily retrieve documents from any location once annotations are made to the document. For example, existing systems do not have a way to that allows the user to continuously access and make comments to the document.

Another example, of an existing system for editing documents can be found in Boys, et al. (U.S. Pat. No. 5,875,448). The Boys, et al. patent describes an audio editor that operates on a file that may contain text and voice data in separate regions. The audio editor described in Boys, et al., provides functions for entering voice data, and also for editing the entered voice data. Once such voice data is entered and edited that data is passed to an individual for conversion into a text file. Files can be uploaded from the audio editor to a PC application for converting the file entirely to text, providing a system wherein all variable entry and editing can be done verbally, and conversion to text is left as a final chore.

FIG. 2 illustrates a representation of a data file as used in the audio editor described in Boys, et al. Data file 200 is created by the audio editor or some other digital device and downloaded to the audio editor. The file typically consists of digitally recorded voice data entered via a microphone or some other audio input. However, in some instances the data file supplied to the audio editor may have machine operable text code, as in a PC word processor file, and other portions that are digitally recorded voice. The dual nature of the data file is important because the final desirable form of a file is machine-readable code (e.g., a finished word-processor document). Thus, the nature of data file 200 is a formatted word processor file having sections wherein data may be added and edited as digitally recorded voice. This formatted file 200 contains sections such as headers, footers, subheads, (e.g., elements 202, 204, 206, 208, 210, 212, and 213) that cannot be edited by the audio editor because they are machine operable-text code. Boys, et al. does contemplate the use of text-reading software to render elements 202, 204, 206, 208, 210, and 212 as synthetic speech. The text-reading software provides users with a way to review all parts of the file 200, but the user "may only enter, add to, and edit the digitally-recorded audio portions" (See Boys, et al., Column 9, lines 4-5). In between elements 202, 204, 206, 208, 210, and 212 file 200 contains portions 59, 61, 63, 65, 67, and 69. These portions are reserved for digitally recorded voice. Thus, file 200 may contain both text portions (referred to as machine-operable text code) and digitally recorded audio portions. When the user selects a play button both the text portion and the audio portion are vocalized. The user may then forward or rewind the file to hear different portions vocalized. Thus, the audio editor provides users a way to create and edit a file before converting the file entirely to machine-operable code (e.g., text).

Once the user has finished creating the file it may be uploaded to a host computer such as a PC and converted into text. An operator does the final conversion using a word processing application. The word processing application displays file 200 in a manner that shows the text and vocal portions of the file. The operator may listen to the vocalized portions by selecting such portions with a mouse or other pointing device. The operator may then enter the vocalized data as text as it is recited.

There are multiple problems associated with the approach utilized in the Boys et al. reference. Boys et al., for example, does not provide a mechanism for verbally editing all aspects of the file (e.g., elements 200-213) cannot be edited. Boys et al. discloses a mechanism for editing the audio portions of file 200, but does not provide a way for the user to edit or comment on text elements in the file. Boys et al. is directed to creating and subsequently editing audio files that are inserted into a template file containing elements that cannot be edited. Thus, Boys, et al. limits the operations of the user by restricting the elements that can be edited. Moreover, Boys et al. does not distinguish between vocalized input that is intended to be a comment or annotations. Rather Boys, et al. provides a way to add or makes changes to a document, but the user cannot flag certain portions of input as general comments. Another limitation inherent in the design utilized in Boys et al. is that the audio portions of the file must be manually converted into text via an operator. Boys et al. does not have a mechanism in place for automatically converting or aiding the user in the editing process. Boys et al. also lacks a mechanism for selectively listening to comments made by a particular user. In Boys et al., if two people edit the same document, the system does not distinguish between the parties and provide users a way to selectively listen to the comments of one party or another. Rather, the audio editor is intended to aid a single user in the creation and editing of a single file. The audio editor is used to generate documents not comment on an existing document without necessarily modifying the contents of the document itself. A further limitation in current systems is that such systems are not directed to providing documents to users in any location. Users of the audio editor described in Boys et al. cannot, for example, obtain a document from a remote location without having an instance of the document on-hand.

Thus, there is a need for a system that solve the limitations inherent in the prior art by allowing the user to listen to a document and verbally comment on the contents of the document without necessarily changing the document. Moreover users could benefit from a system that aids the user responsible (e.g., the typist or data entry person) for the conversion process. In some instances there is also a need for a system that allows user to selectively listen to comments made by a certain individual without having to review all comments that were made about the document.

In the foregoing discussion about current systems, the problems and limitations set forth as existent in the prior art are provided for exemplarily purposes. It should be clear to one of ordinary skill in the art that these problems also exist in other contexts or professions and that the invention may apply to situations other than the ones described herein.

SUMMARY OF THE INVENTION

An embodiment of the invention describes a system that enables people to add verbal annotations (i.e. add comments) to a digital document such as a movie script, book, or any other type of document. This device provides the reviewer with an improved way to interact and comment upon documents while on the move. For example, the reviewer may utilize an embodiment of the invention to access and verbally comment on a document from multiple locations. Thus, the invention provides a system that enables the reviewer to begin reviewing a document from a cell phone, continue to review the same document from a home PC, and finish reviewing the document from a pay phone. An embodiment of the invention also provides the reviewer with an intuitive way to verbally interact with documents. The system can read documents (e.g., via a text-to-speech engine) so that the reviewer can hear the contents of the document. The system also provides the reviewer with a way to record verbal comments about the document. When a comment is supplied the comment becomes associated with the location in the document where the comment was provided. If, for example, the reviewer makes a comment about a particular passage of text, the comment becomes associated with the passage of text the comment is related to.

The device that embodies the invention uses an audio output mechanism to play the document to the user. At any time during playback the user may provide a comment by selecting an annotate button and simply speaking to the device. In turn, the device records the user's comment and associates it with the location in the document where the comment was given. If the document is replayed after a user provides comments, the device plays back the document and the comments via the audio output mechanism. This way the user can hear the document and any comments that were made about the document.

Some examples of the type of devices that can be configured to implement embodiments of the invention include the components of an automobile sound system, a cell phone, a regular telephone, a personal computer, or any other computational system. Each of the devices that embody the invention may access the document (e.g., via a data storage medium or computer network) so as to provide the user with a way to review documents from multiple locations using multiple types of devices. The user may, for example, begin reviewing a document in an automobile, continue to review the document via a cell phone, and finish reviewing the document from home using a regular phone line.

One or more embodiments of the invention comprises a method and apparatus that enables users to add any number of annotations (i.e. add comments) to a digital document such as movie scripts, books, etc. from anywhere in the world. Thus, an embodiment of the invention enables users to hear and comment on a document from one or more locations. Any type of computational device may be configured to embody the invention and thereby provide the user with an interface to comment on or review comments about a particular document. Some examples of the type of devices that can be configured to implement embodiments of the invention include, the components of an automobile sound system, a cell phone, a regular telephone (e.g., POTS), a personal computer (e.g., a PC or a PDA), or any other system capable of accepting audio input and output. Each of the devices that embody the invention may access the document so as to provide the user with a way to review documents from multiple locations using multiple types of devices. The user may, for example, begin reviewing a document in an automobile, continue to review the document via a cell phone, and finish reviewing the document from home using a regular phone line.

Multiple types of devices can be modified to incorporate aspects of the invention. For example, an annotation device (e.g., an apparatus) having a processor and memory containing a text document may be coupled with a document processing engine that is configured to obtain the text document from memory and convert a portion of the document to an audio file that can be played to a user. If a user indicates a desire to hear the content of a document the annotation device uses an audio output mechanism to play the audio file to the user. If the user provides a comment to the annotation device an audio input device configured to obtain such verbalized comments from the user stores the comment as an audio comment file. The annotation device passes the audio comment file to an annotator that is configured to associate the audio comment file with a location in the text document that corresponds to the audio file playing when the first user provided the verbalized comment.

Another embodiment of the invention comprises an apparatus that utilizes a set of components distributed across a network. In this embodiment a server that has a text-to-speech engine obtains a document comprising text from a document source (e.g., memory or another computer) and converts some or all of the text in the document into an audio file. A thin-client (e.g., a user interface device) obtains the audio file from the server via network connection and an audio output device associated with the plays the audio file to the user of the thin-client. If the user desires to make a comment about the document, the user may provide verbalized input (e.g., comments and/or annotations) to an audio input device associated with the thin-client. Once the user provides such input, the input is transmitted to the server computer where the file is stored as an audio comment file (e.g., in the associations data structure). The server computer comprises an annotator that is configured to associate the audio comment file with a location in the document that corresponds to the portion of the audio file playing when the user provided the comment.

The invention also contemplates a method for annotating a document. Computer software may complement the method by performing some or all aspect of the process described. One embodiment of the invention is a method for annotating a document that comprises: generating authentication information of a user desiring access to a document; allocating an associations file structure for the user; obtaining the document from a memory medium via an interconnection path configured to access the document, the document having text elements; obtaining a first annotation of the text document, the first annotation having a first set of audio elements; converting the text elements to a second set of audio elements; associating the first set of audio elements with the second set of audio elements to generate a playback document; generating an audible playback of the playback document to the user when the user indicates a desire to hear the document; obtaining verbalized comments from the user via an audio input mechanism upon activation of an annotation trigger during the audible playback; associating the verbalized comments with a location in the playback document corresponding with the occurrence of the annotation trigger during the audible playback; and storing the location and the authentication information of the user and the verbalized comments in the associations file structure.

In one or more embodiments of the invention, a line-based document to be annotated may be provided to the reviewer in the form of an audio file. To facilitate the use of audio files for annotation purposes, an enhanced audio file format is disclosed, which includes audio data for playback purposes, as well as an index or mapping associating time codes for the audio data with line numbers on the original document. Some embodiments may alternatively or additionally embed line identifiers (e.g., line numbers) in a time code data channel or other parallel data channel of the audio file.

The apparatus of the invention includes a pre-processing module that receives a line-based document in text form (e.g., as an HTML file) and outputs the enhanced audio file. Text-to speech functionality within the pre-processing module generates the audio data portion of the file. As the audio data is generated, the time codes of the audio data may be matched with the line number of the text line to form the line ID-time code map or to embed line identifiers in the time code data channel (or other parallel data channel). Alternatively, the audio data and line ID-time code map may be generated serially.

The map portion or line number data channel of the enhanced audio file format is used by the annotation apparatus for navigation through the audio version of the document. Also, when an annotation entry (e.g., .wav file or MP3) is initiated, the line ID-time code map or embedded line identifier data may be used to associate a document line number with the annotation entry.

In one or more embodiments, the line-based document may be converted into multiple audio files. For example, to optimize an audio file for the memory resources of a target device, the line-based document may be converted into sections or chapters of audio data that can be processed efficiently within the constrained memory resources of a mobile annotation device. The chapter/section size may be a fixed or default value, or it may be a user-configurable value. Also, during pre-processing, multiple audio files may be generated with different playback speeds (i.e., slower and faster speaking voices). The reviewer may then select the playback speed with which he or she is comfortable. The playback device can seamlessly change playback speeds (e.g., in response to voice commands) by switching between audio files with different playback speeds, rather than resampling a single set of audio data. Audio distortion from back-end resampling may therefore be avoided.

In one or more embodiments, an annotation device and/or a post-processing system may provide an output document having embedded links to audio annotation files and/or text annotation files. Further, a navigation index may be provided that comprises a list of annotations, with links to the document line number and the respective annotation files (audio and/or text). The navigation index may also provide a list of bookmarks having links to selected line numbers in the line-based document. A reviewer may, for example, view the line-based document in a first application (e.g., a browser) window, while the navigation index is presented in a separate portion of the first window or within a second window.

BRIEF DESCRIPTION OF THE DRAWINGS

FIG. 24 illustrates an example embodiment of a navigation index window of an embodiment of the present invention.

DETAILED DESCRIPTION

A method and apparatus for annotating line-based documents is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

It is important to note that any type of individual who has a need to review documents may utilize one or more aspects of the invention. Movie producers, directors, actors, and other entertainment industry people as well as doctors, lawyers, teachers, students, businessmen, and many other types of individuals encounter the problems solved by embodiments of the invention. Thus, it should be clear to one of ordinary skill in the art that there are multiple contexts within which to utilize the method and apparatus for annotating documents described herein.

System Overview

In one or more embodiments of the invention, the apparatus and methods described herein allows users to review and add any number of annotations (i.e. add comments) to a digital document such as movie scripts, books, etc. from anywhere in the world. For instance, the invention may play the document to the user via an audio output mechanism and provides the user with a way to comment on the document by simply speaking to an audio input mechanism. Any type of computational device may be configured to embody the invention and thereby provide the user with an interface to comment on or review comments about a particular document. Some examples of the type of devices that can be configured to implement embodiments of the invention include, the components of an automobile sound system, a cell phone, a land-based telephone, a personal computer (e.g., a PC or a PDA), dictation device, or any other system capable of accepting audio input and output. Each of the devices that embody the invention may access the document so as to provide the user with a way to review documents from multiple locations using multiple types of devices. The user may, for example, begin reviewing a document in an automobile, continue to review the document via a cell phone, and finish reviewing the document from home using a regular phone line.

Figure 1:
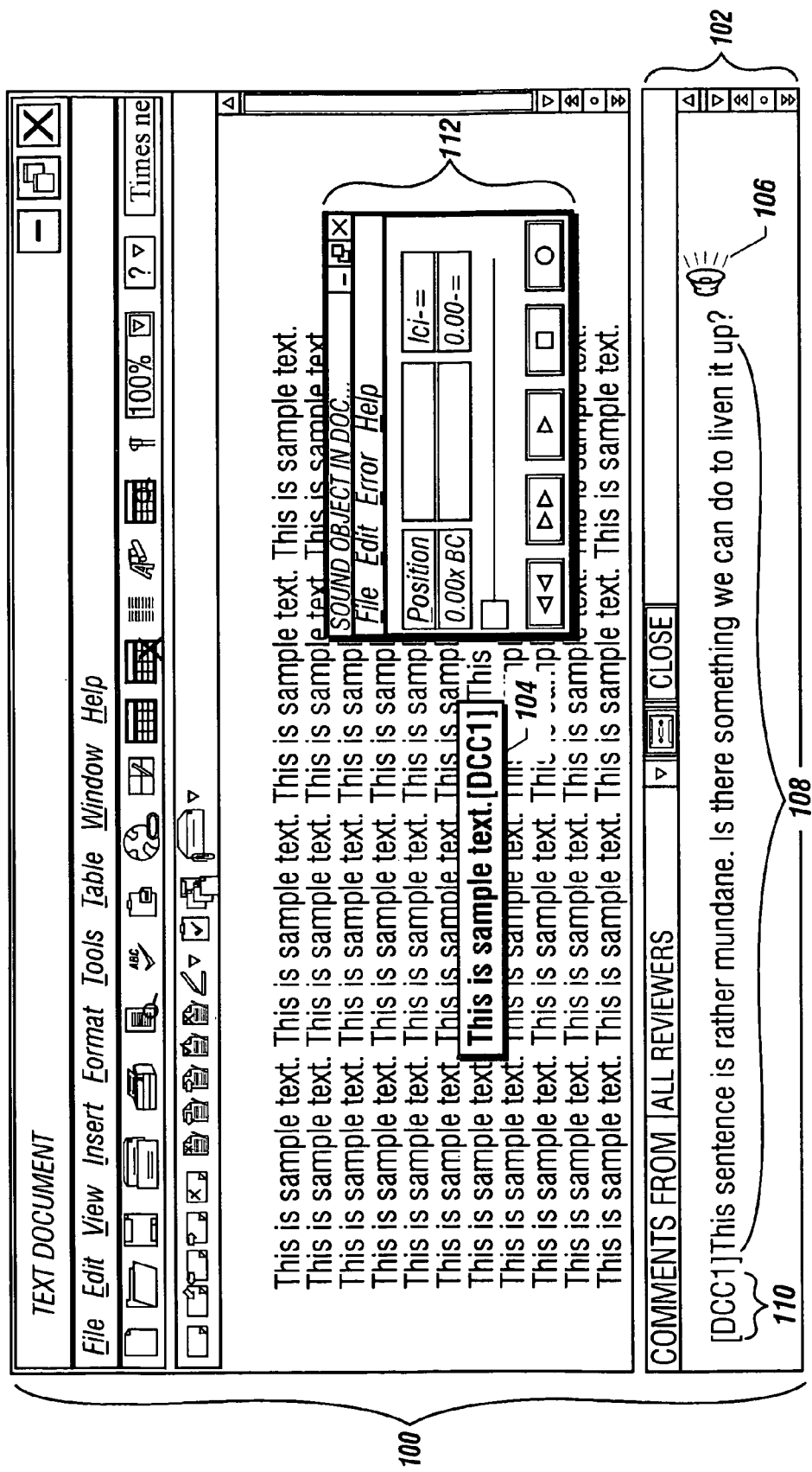
FIG. 1 illustrates a word processing environment that contains a way for users to manually insert comments into a document.
Figure 2:
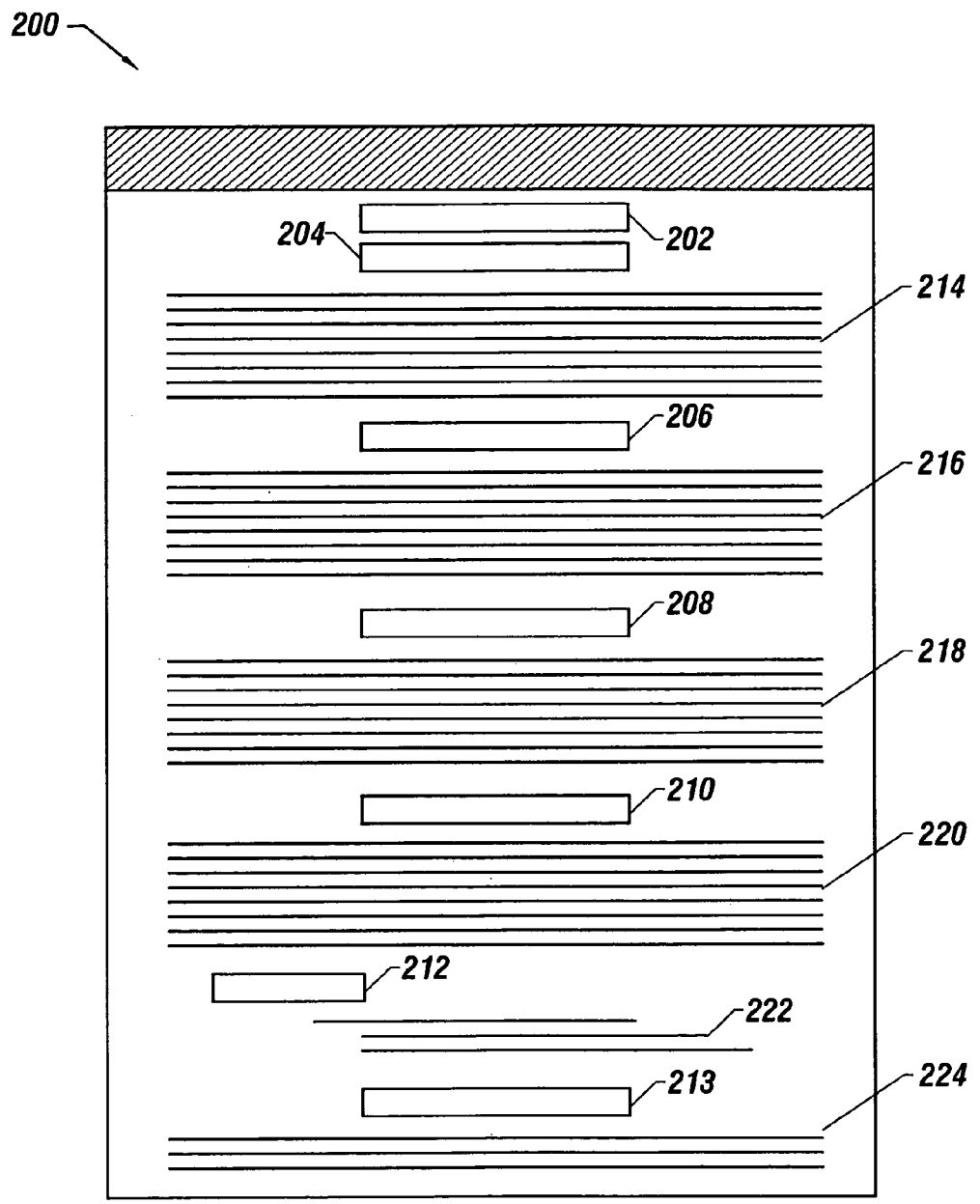
FIG. 2 illustrates a representation of a data file as used in a prior art audio editing device.
Figure 3:
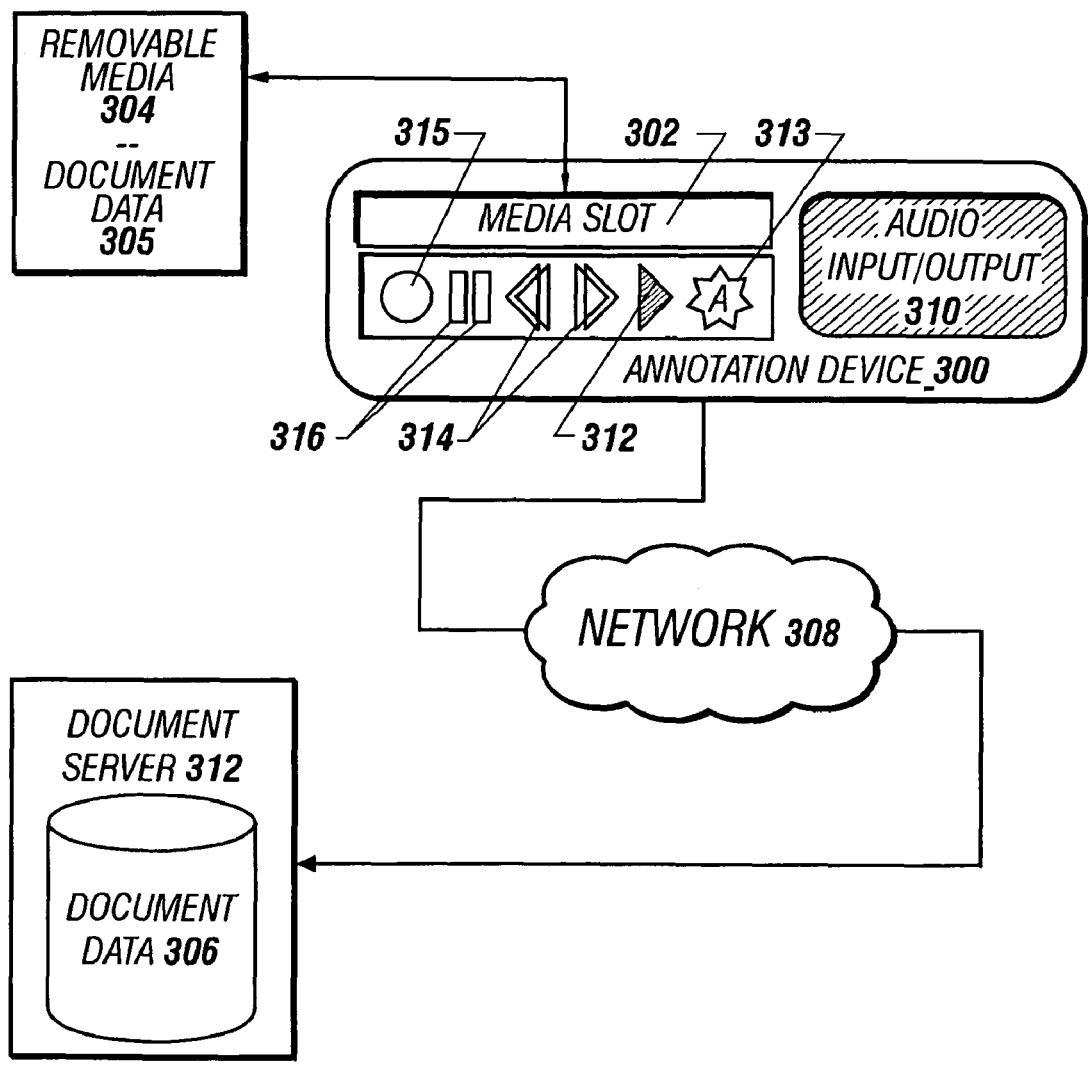
FIG. 3 provides an example of the command interface associated with an annotation device implementing an embodiment of the invention.

If a user wishes to review the contents of a document while the user is at a remote location (e.g., in an automobile), the user may utilize a device (see e.g., FIG. 3, annotation device 300) implementing one or more embodiments of the invention to obtain and play an instance of the document the user wishes to hear. The user may provide documents to the device via any type of removable media 304 (e.g., flash memory, floppy disk) comprising document data 305. The user may insert such removable media into media slot 302. In accordance with one embodiment of the invention the device can also be configured to obtain document data 305 from server 312 via network 308 (e.g., a wireless network, the Internet, a radio frequency (RF) network, cellular network, etc. . . . ). Documents typically originate as text data (e.g., Microsoft Word™ files, HTML files, XML files, or any other type of ACSCII or binary data representing a document) and are converted to audio data prior to playback (e.g., via a text-to-speech operation which may be referred to in one embodiment of the invention as a document processing engine). However, the invention contemplates embodiments configured to interact with multiple types of documents and may be adapted to provide users with the ability to review any type of digital document.

The text-to-speech operation that prepares the document data for audible playback to the user may occur at server 312 or at annotation device 300. In one embodiment of the invention, the user of annotation device 300 may begin reviewing a document by identifying which document to review and selecting play button 312. This causes the device to audibly playback the document to the user via audio output 310. If the document was originally text, the device converts the text into sound files (e.g., via the text-to-speech engine) before it sends the sound data to audio output 310. Any time during playback of the document, the user may verbally insert comments into the document by selecting annotate button 313. Upon activation of annotate button 313, annotation device 300 begins to collect audible comments provided by the user via audio input 310. Thus, the annotation device comprises a mechanism such as a microphone for collecting audible words (e.g., comments/annotations) from the user.

Each comment the user provides is stored by the system in memory (on the client device or the document server) and associated with a location in the document that is contextually relevant to the comment. If, for instance, the document is a script, the person reviewing the script may insert comments about a particular scene or treatment at a point in the document that correlates to the scene or treatment to which the comment pertains. If the user makes a comment about scene 1, that comment is associated with scene 1 so that if another individual revisits the document after the first user inserted the comment that individual can review the first user's comments along with the contents of the document.

If the user wishes to forward or rewind to a certain section in the device, the user may utilize forward/rewind button 314 to reach a certain place in the document. Button 314 therefore provides the user with a way to quickly forward to or rewind to relevant portions of the document. In one embodiment of the invention, button 314 comprises a shuttle/jog button such as the type utilized in linear editing. Stop button 315 provides users with a means to stop playback of the document. The invention may also comprise pause button 316 which when depressed causes playback to suspend for a certain interval of time until the user indicates by selection of another button to resume playback of the document. One embodiment of the invention contemplates the use of voice-activated software in order to implement the functions associated with buttons 312-316. In this embodiment, the user may annotate a document by verbally issuing an annotations command while the document is playing.

Once the annotation device obtains comments from the user, the comments are stored in a digital memory medium for later use and/or processing. The stored comments may, for example, be converted from audio data back into text data via a speech recognition engine (SRE). Thus, the comments associated with the document may be stored in text and/or audio form. If the same or another user plays the document back at a different time, the device obtain the originally sampled audio from memory and plays it back when the user is listening to the point in the document where the comment was previously given. In one embodiment of the invention, the user who provided the comment is audibly identified when the comment is played. If, for example, a user named user 1 made comments about a particular portion of a document, the device would identify, at the time the comment way played, that the comment originated from user 1. Thus, the device provides users with a way to identify who each set of comments originated from. The user reviewing the document may elect to hear comments from certain users while excluding comments from other users. If, for instance, the reviewer wishes to hear user 1's comments, but not user 2's comments, the review may request that the device only playback user 1's comments.

Figure 4:
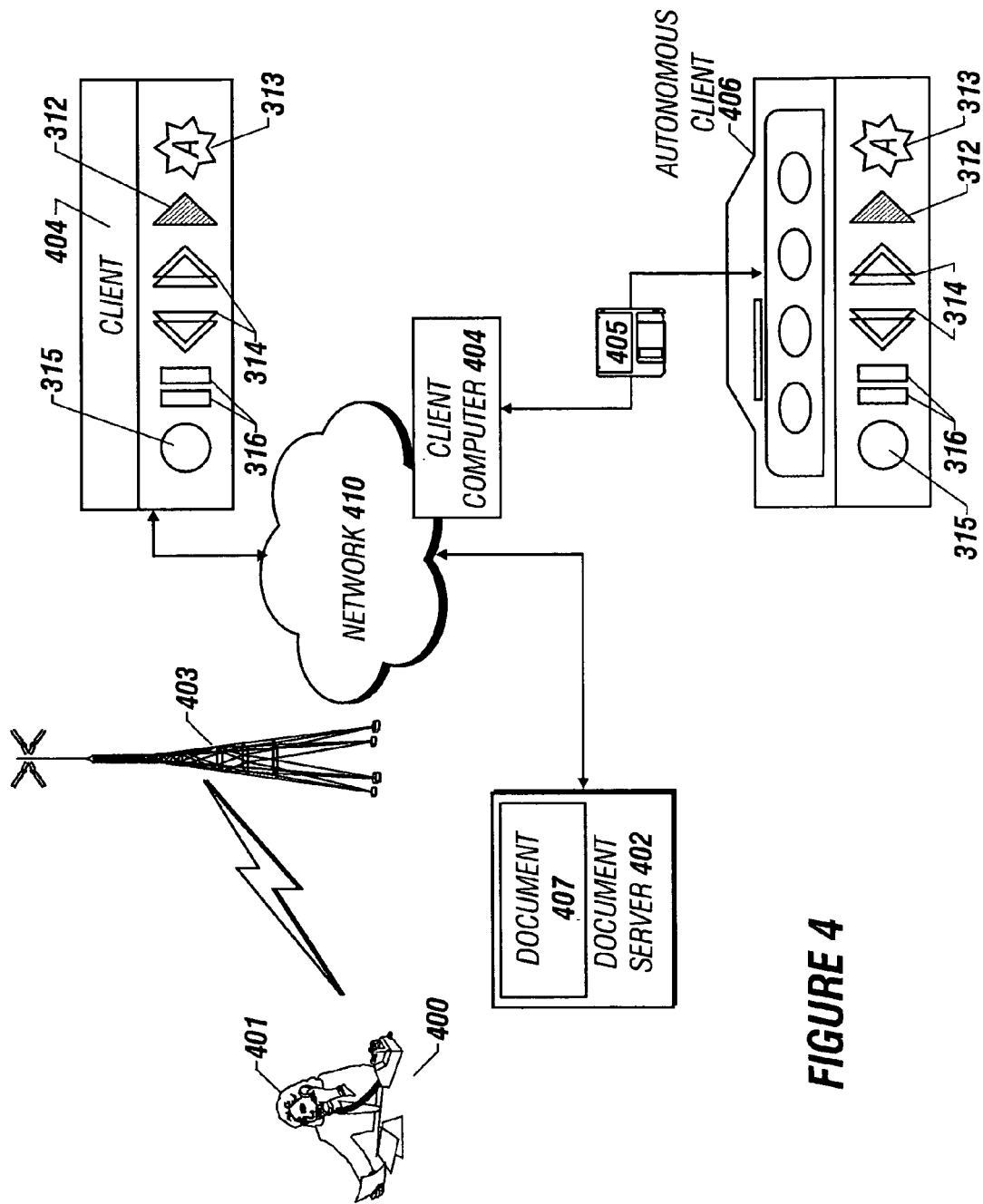
FIG. 4 is an illustration of some of the types of apparatus utilized in accordance with one embodiment of the present invention to annotate a document.

FIG. 4 is an illustration of some of the different types of annotation devices that may be utilized to annotate a document. Each type of device provides the user with a means to annotate a document from a different location. The illustration of FIG. 4 shows user 400 desiring to comment on document 407 located in document server 402. User 400 may accomplish this by utilizing device 404, 406, or 401. Annotation device 401 comprises a land-based telephone (e.g., a payphone, home phone, business phone, cell phone, etc. . . . ).

In the embodiments where mobile client 401 is a wireless device, wireless tower 403 may be used to interconnect between annotation device 401 and communication network 410. Annotation device 401 may comprise a "smart" device configured with adequate processing power and memory to handle the requirements of the present invention. For example, if annotation device 401 comprises a smart mobile client device 401 should have the computational power to perform the annotating functions described in FIG. 5 in addition to the control functions 502 for playback of the original document.

In another embodiment, annotation device 401 is a "thin" device such as a land telephone or RF device. In the land telephone configuration, annotation device 401 provides the playback control functions 502 of FIG. 5 for playback control of the document. For example, the telephone keypad keys or appropriate voice commands may provide the playback control functions. The FIG. 5 functions depicting annotating engine 500 and speech recognition engine 510 are performed in one embodiment of the invention in document server 402.

Annotation device 401 may comprise any device with access to different types of communication interconnects. An embodiment of the invention contemplates the use of any type of interconnection fabric that provides one or more suitable communication paths for carrying data between multiple types of computational devices. The interconnect fabric may be a type of wireless transport mechanism that may act as a carrier wave for data. For example, an embodiment of the invention may utilize a Cellular Digital Packet Data (CDPD) network, a Global System for Mobile (GSM) network, a Mobitex network, and/or any other type of radio, satellite, or wireless communication channel that can establish a link between multiple devices. Annotation device 401 may, for example, transmit data to or receive data from communication network 410 (e.g., the Internet) to document server 402.

Annotation device 401 provides user 400 with an interface for controlling the output of document server 402. User 400 may, for example, utilize annotation device 401 to connect to a system (e.g., server 402) configured to audibly play documents (e.g., document 407) to user 400. In this embodiment of the invention document server 402 may utilize one or more components of a voice mail system to play document 407 to the user. The voice mail system is adapted in such a way that it can access and play document files that reside in a predetermined location via network 410. If the files accessed are text data the system may convert them to audio data via a text-to-speech engine. When the user access the system, the user selects a document to hear (e.g., by navigating a hierarchical menu structure) and the system plays that document to the user. If the user wishes to provide comments about the document the user indicates to the system that a comment is going to be provided (e.g., by pressing a key on the telephone keypad). When the user makes such an indication, the system pauses playback of the document and marks the location of the comment. The user may then provide a comment to the system by making a verbal statement to the system. The system records the user's comments and associates that comment with the location in the document identified by the user. If the same or another user plays the document back again, the system plays the previously provided comment when the system reaches the location in the document where the user previously submitted a comment. Thus, users may utilize annotation device 401 as an interface to document server 402 so as to listen to and submit comments about a particular document.

Annotation device 404 and 406 comprises a client device (such as the one illustrated in FIG. 3) configured to obtain document data from one or more sources. Device 404 comprises a personal computer, PDA, or some other type of client computing device configured to obtain document 407 from document server 402 via network 410. In one or more embodiments, annotation device 404 may be used for the annotating function. Annotation device 404 is connected to document server 402 through communication network 410. Annotation device 404 is capable of processing data from removable storage media 405, from document server 402, or from any other data source. Data that is stored (e.g., document 407) may comprise the document to be annotated or the annotated document. In the case where the document data is contained in removable storage media 405, client computer 407 may be used to transfer the data to document server 402. For example, removable storage 405 may contain data processed in autonomous client 406.

Autonomous client 406 comprises another type of device that may utilize one or more embodiment of the invention. Users of autonomous client 406 may manually provided document data taken from client computer 407 via removable storage media 405. Autonomous client 406 is capable of processing document file stored in removable storage 405. In one or more embodiments, autonomous client 406 does not have direct connection to communications network 410. In this configuration, autonomous client 406 possesses the full capability to perform the functions described in FIG. 5. Thus, autonomous client 406 comprises enough components to act as a stand-alone device for annotating documents.

Autonomous client 406 includes control functions for playback of the document contained in removable storage 405 such as Play, Rewind, Fast-Forward, Pause, Stop, Annotate (i.e. mark), etc. It will be apparent to one of ordinary skill in the art that other playback control functions not described in this disclosure can be added, subtracted, or substituted to provide the capability for optimum playback of the document. For example, it may be desirable to have the ability to enter a user identification, to vary playback speed, to provide jump functions, and find functions. Thus, autonomous client 406 may be modified to incorporate these and other playback control functions.

Document server 402 maintains the current copy of the annotated document. In one or more embodiments of the invention, document server 402 is on a worldwide communications network so that users may log on (using device 401, annotation device 404, or client computer 404) to comment on a particular document from anywhere in the world. Document server 402 also maintains the capability to perform some or all of the processing functions described in this disclosure. For example, document server 402 has the ability to perform the full processing described in FIG. 6 as well as store and maintain the original document and its annotations. Document server 402 may also maintain a security mechanism that prevents unauthorized access to the documents. For example, document server 402 may require a logon ID and password or perform some other type of authentication before access can be granted to the document file contained therein.

Annotating Engine

Figure 5:
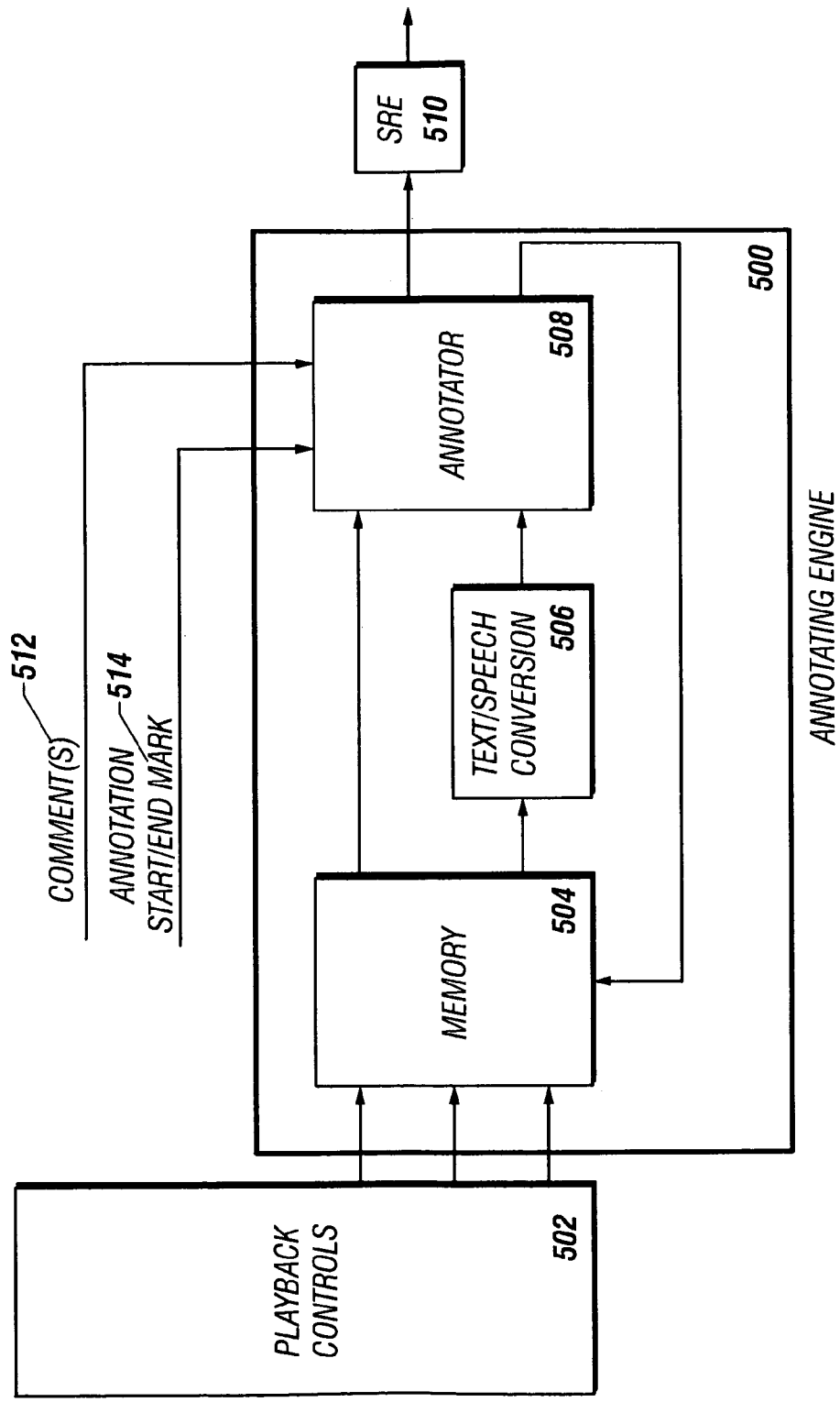
FIG. 5 illustrates the basic components for annotating a document in accordance with one embodiment of the invention.

One or more embodiments of the present invention comprise an annotating engine as shown in FIG. 5. Annotating engine 500 accepts control inputs from playback controller 502 and comments 512 from a user. For example, when a user desires to comment on a document contained in memory 504, the user performs any necessary authentication to gain access to the document. After access is granted, the document in memory 504 may be played back using controls functions from playback controller 502. Memory 504 comprises any type of memory (e.g., flash memory, removable storage media, static storage, or any other type of computer memory).

Figure 11:
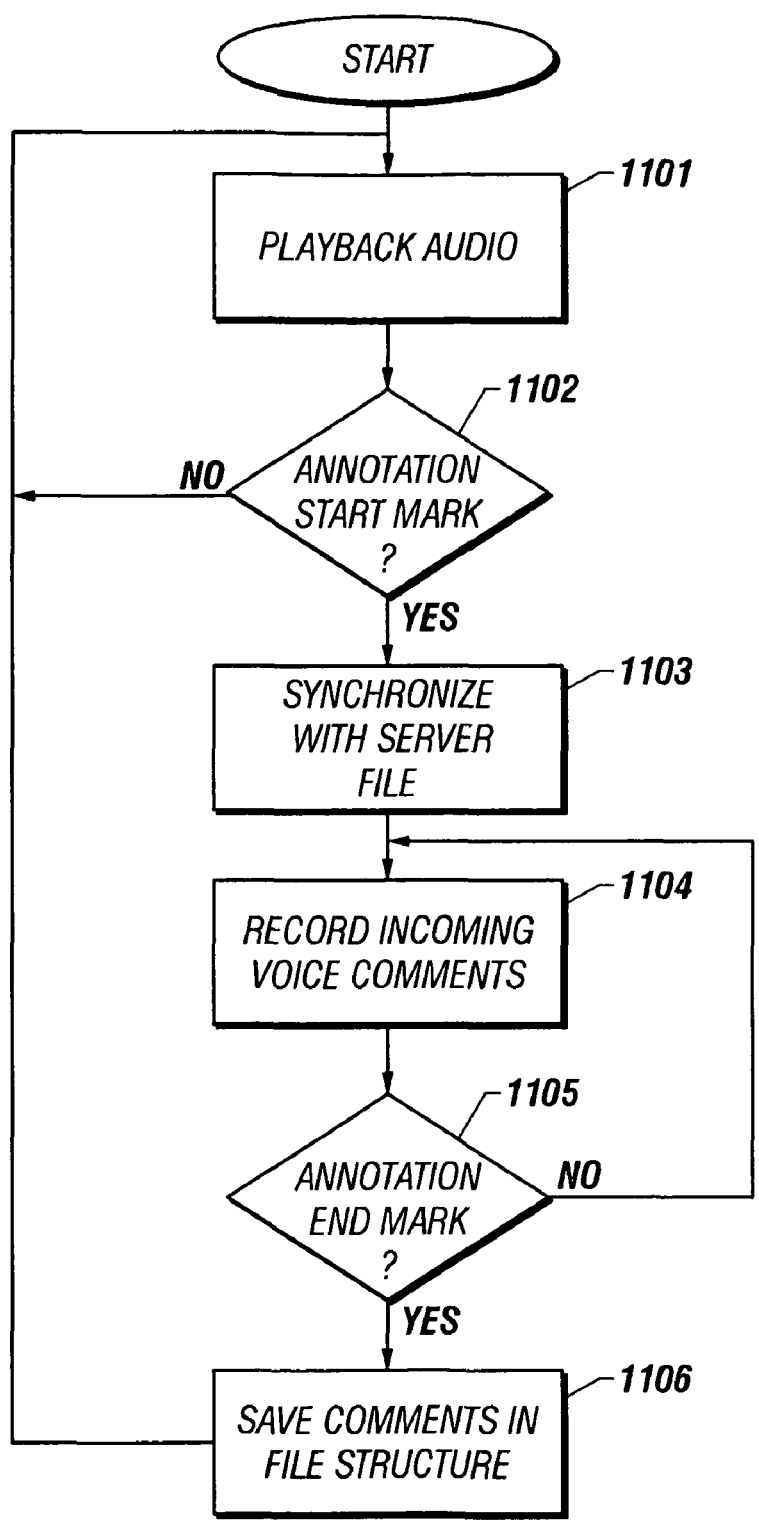
FIG. 11 is a flow diagram of the processes performed by the document server when interacting with a thin terminal according to one embodiment of the present invention.

Once the user provides comments 512, annotating engine 500 associates comment 512 with the location in the document where the comment was provided. For example, annotating engine 500 preserves the original document in memory 504 and creates the associated files (i.e., Annotations file, Annotations index file, and Annotations names file) as shown in FIG. 11.

Playback controller 502 provides playback instructions to the annotating engine. Playback controller 502 provides commands such as play, rewind, fast-forward, pause, stop, and annotate (i.e. annotation start mark 514) to control the playback of the data in memory. Playback control functions are not limited to those listed above, other functions that may enhance playback to the user such as volume control in embodiments that employ audible playback as feedback to the user. Other examples may include variable speed controls, jump and find functions. For example, the user may desire to jump to the beginning of the document or to a known point in the data.

During playback, the document may be converted to speech in text/speech conversion block 506 if the document is text and if audible playback is desired. Text/speech conversion block 506 comprises a text-to-speech conversion engine configured to accept text as input and generate audio as output. Some examples of text-to-speech engines that text/speech block may comprises includes text-to-speech engines such as the ones made by Lernout & Hauspie, Microsoft™, or any other text-to-speech provider. A user desiring to add comments to the document at a particular point during playback generates an annotaion start mark 514 by selecting performing an action such as selecting annotate button 313. However, the invention contemplates other mechanisms that may cause an annotation start mark 514 to occur. For instance, annotation start mark may be voice activated or activated by any other command provided by the user who desires to provide an annotation.

At the occurrence of annotation start mark 514, audio playback of the document pauses and annotator 508 begins recording user comments. A subsequent annotation mark 514 (e.g., an end annotation mark) may signify the end of user comments for that location in the document. In some instances the passage of a certain period of time causes the annotation end mark 514 to occur. If, for example, after causing an annotation start mark 514 to occur, the user does not speak for some interval of time, the annotation end mark 514 will occur and thereby mark the end of the user's comment.

In one embodiment of the invention, annotator 508 has the capability to transmit sound and text data to the user. For example, audio sound generated in text/speech conversion block 506 may be transmitted to the user via a speaker system. If the system is part of an automobile sound system, for instance, audio data may be generated and sent via the speaker system associated with the automobile's stereo system. If the document contains sound data, the annotator 508 utilizes a media player to play the sound data directly to the user via the speaker system. Annotator 508 has the capability to receive and record sound and text data. For example, user comments 512 may arrive from a sound input source such as a microphone and recorded in memory 504 by annotator 508. Thus, annotator 508 comprises or is associated with an audio input/output mechanism that can collect audio data from or provide audio data to the user.

Annotator 508 determines the location in the document under review that corresponds to occurrence of the annotation start mark 514. This location signifies the place where the user began making comment 512 (e.g., the start). Upon receipt of the annotation start mark, annotator 508 determines the current location of the document under review. This location is stored, in one embodiment of the invention, as part of the associations files discussed in FIG. 11. Concurrently, annotator 508 starts recording the user's comments 512 until receipt of an end annotation mark 514. During recording of the user's comment, annotating engine 500 suspends playback of the document under review at the point corresponding to the location where the user began making comment 512. Playback of the document resumes at completion of recording of the user comments. For instance, playback resumes when the user submits an end annotation mark 514.

After playback of the document and recording of user comments are complete, annotator 508 stores the associations information (See FIG. 11) into memory 504. The associations information comprises data memory that represents the comments provided by one or more users. Each comment is typically associated with a certain document and/or a certain user. In one embodiment of the invention, the associations information is stored in a data structure comprising an annotations names file, annotations index file, and annotations file. The specifics of this associations data structure are discussed later in this specification. When the annotation device utilizes the associations data structure, the integrity of the original document is not compromised during processing.

Annotator 508 converts the recorded data to proper format for storing. In one or more embodiments, the comments are stored as sound data in a WAV file or any other audio format capable of storing sounds data (e.g., MP3, RealAudio™, etc. . . . ). Comments may also be converted to text for storage or for transmittal as data packets using protocols such as the Wireless Applications Protocol (WAP) in cases where processing is done in a wireless client and where text transmission is desirable over voice transmittal. When conversion of the comments to text is desired, Speech Recognition Engine 510 may be used to convert the comments to text. In one or more embodiments, annotator 508 provides the user the capability to review comments before saving the comments in the data structure.

Process Utilized to Obtain/Playback Annotations

Figure 6:
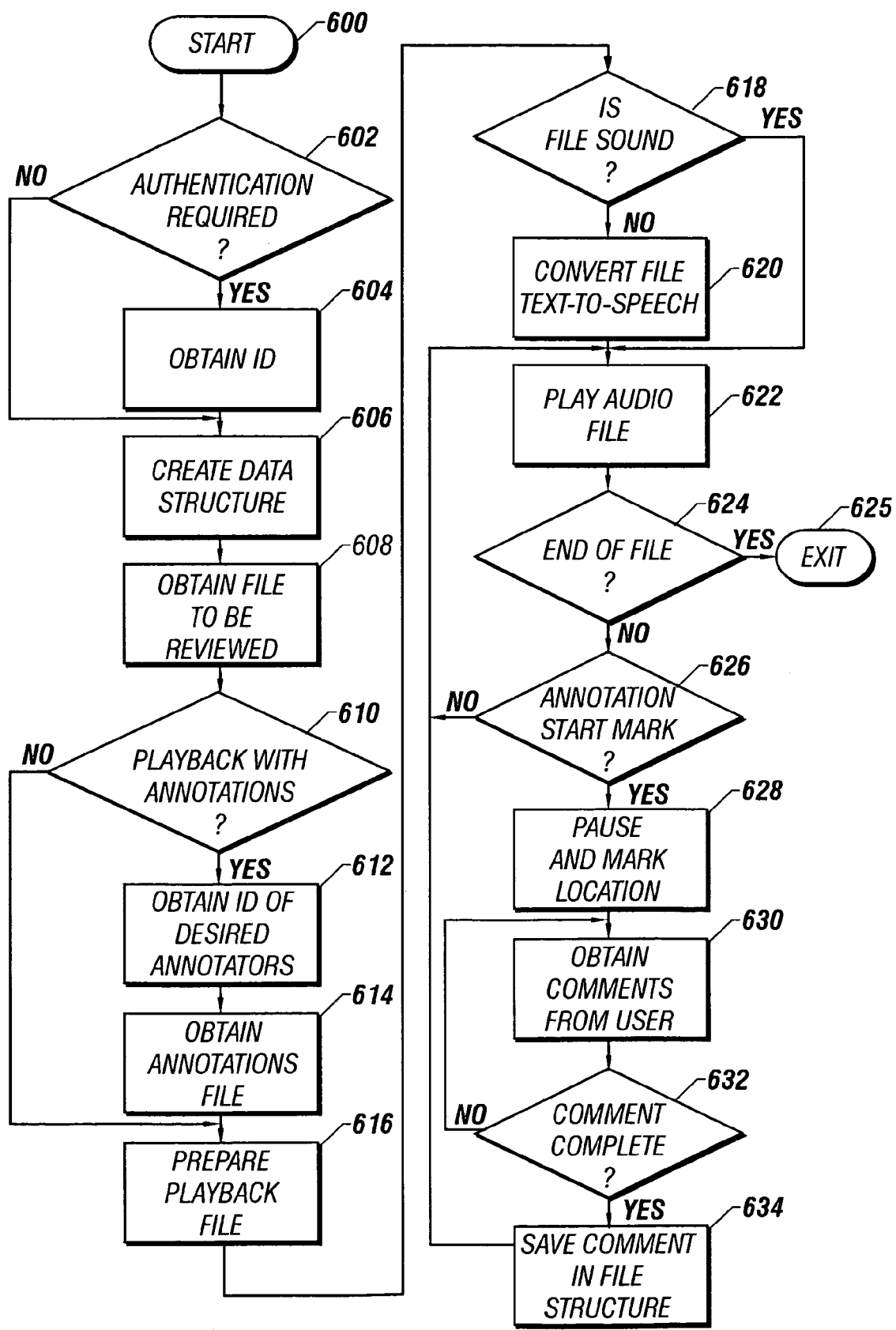
FIG. 6 provides an example of the process utilized in accordance with one embodiment of the invention to annotate a document.

FIG. 6 provides an example of the process utilized in accordance with one embodiment of the invention to annotate a document. The process may be implemented in hardware and/or software form and may, for example, comprises computer readable program code tangibly embodied in a computer readable medium such as a processor, or memory coupled to the processor. In other instances, the invention executes in memory such as a hard disk, floppy disk, and/or any other form of memory capable of storing computer readable program code. The computer program or hardware device is referred to herein as the system. As will be discussed herein, certain executable and non-executable portions of the files that are used by embodiments of the invention may be distributed or obtained via a network (e.g., a wireless network).

When the system enters an execution state at start point 600 the system waits for input from the user. In accordance with one embodiment of the invention input from the user may require authentication. Authentication provides the system with a way to determine which user made a particular set of comments. If multiple users comment on the document, the authentication data enables the system to discern between comments provided by different users. If authentication is required (e.g., at step 602), the system obtains a unique identifier (e.g., at step 604) from the user or the system associated with the user. If such authentication is not required, the system allocates a portion of memory to the system for one or more data structure(s) (e.g., at step 606) associated with the annotations to be provided by the user. One of ordinary skill in the art should recognize that the invention also contemplates embodiments where the system allocates memory earlier or later in the execution process.

Once memory is allocated for the data structure, the system obtains the file that is to be reviewed (e.g., at step 608). This file typically comprises a document containing data such as text and/or other elements. Documents may, for example, originate as text files (e.g., ASCII, EPSIDIC, etc. . . . ), audio files, (e.g., MP3, RealAudio™, WAV, etc. . . . ), image files (e.g., GIF, JPG, TIFF, etc.) movie files (e.g., AVI, MPEG, RM, etc. . . . ), or any other type of file containing data the user of the system may wish to review and subsequently comment upon. When the file to be reviewed (or the location of the file) is loaded into memory the system waits for the user to indicate a desire to playback the file with annotations (e.g., at step 610). If the user initiates (e.g., by depressing a play w/annotations button or stating a verbal command) a command to begin playback with annotations, the system responds by obtaining the unique identifier (e.g. ID(s)) associated with the user(s) whose comments/annotations the user operating the system wishes to hear. If for example, the user of the system wishes to hear comments from one or more certain individuals, the ID(s) associated with those individuals are supplied to the system at step 612. The system may default to a setting that plays back all the comments associated with the document or in other instances the system may prioritize the comments by playing comments from some individuals prior to comments from others.

When the system identifies which set of comments to obtain it obtains one or more annotations files (e.g., at step 614). The annotations file is accessible in one embodiment of the invention via an index or set of pointers. Thus, the appropriate annotations file may be accessed by utilizing the index to determine the location of the comments the operating user wishes to hear. Each annotations file comprises one or more files that point to or contain comments from one or more users. In one embodiment of the invention, the annotations file contains a list of memory locations, network addresses, or hyperlinks that reference or comprise user comments. The annotations file may contain components located within memory or distributed across multiple computers accessible via a network (e.g., a wireless network). In one instance, comments are made accessible via a computer network such as the Internet or some other mechanism for obtaining digital files having user comments.

If the user has not initiated a command to review the document with annotations, the system bypasses steps 612 and 614 and executes step 616. At step 616, the system prepares a document file for playback. In the instances where the user has previously indicated a desire to listen to the annotations, the system prepares the annotations file and the document file for playback by associating the two files with one another in a playback file. If the user does not want to hear any annotations, the system prepares the document file for playback without any annotations. Both the document file and the annotations files may comprise text, sound, and/or any other type of data. In accordance with one embodiment of the invention the document file originates as text and the annotations file(s) contains audio data that is related to a particular location in a document. However, both the document file and the annotations file may contain other types of data.

In one embodiment of the invention, the system reviews the type data or contents of the playback file to determine what operations to perform on the playback file. At step 618, the system may determine whether the file is a sound file. If the system encounters a sound file, the system converts the file (e.g., at step 620) from audio data to text data by using a text-to-speech engine. The location of the text-to-speech processing may vary depending upon the processing capacity of the system that is utilized. The text-to-speech conversion may take place on the computer conducting the playback or on a computer separable from the computer performing the playback. After the text-to-speech conversion occurs, the system plays the audio file (e.g., at step 622) via an audio output mechanism. If the system reaches the end of the file (EOF), without the user providing any comments, (e.g., step 624) the system may exit at step 625. However, if the user indicates a desire to provide comments/annotations (e.g., at step 626) by selecting an annotate button, verbalizing a comment, or by some other mechanism for issuing a command, the system executes step 628 where it pauses playback of the audio associated with the text file and inserts a mark at the appropriate location. The mark identifies the location where the user initiated an annotate command. Once the mark is set, the system obtains comments from the user (e.g., at step 630) via an audio input mechanism such as a microphone. The comment may comprise any type of verbalized or non-verbalized input that can be associated with the document about which the user is commenting upon. A comment about a particular segment of text in the document may, for example, contain reference to a Web address that contains information the reviewer wishes to share. Comments may point to other comments so that each comment may be related to or associated with other types of data. The reviewer may therefore reference other URLs or data in a comment and the user listening to the reviewer's comments may access that data.

The system monitors the input to determine when the user finishes providing the comment. When the user finishes the comment, the system saves the comment in the appropriate location. The system may, for example, place the comment into a memory location associated with the data structure allocated at step 606. In some instances, each comment the user provides is saved in the annotations file and stored at any location capable of storing digital data.

Allocation of Processing Responsibilities

When a device is configured to obtain document data and/or annotation data over a network (e.g., a cell phone network, wireless network, etc. . . . ) so that the user can interact with such data, the type of device attempting to obtain access to the data is important. If, for example, the system has sufficient processing capacity, and the network utilized to connect to the system has a low bandwidth or high cost associated with it, the amount of data sent to the device should be minimized and the processing should be performed on the system. If, however, the system does not have any processing resources or has minimal processing capabilities, the processing should be performed on the computer supplying the document or annotation data (e.g., the server computer).

Figure 7:
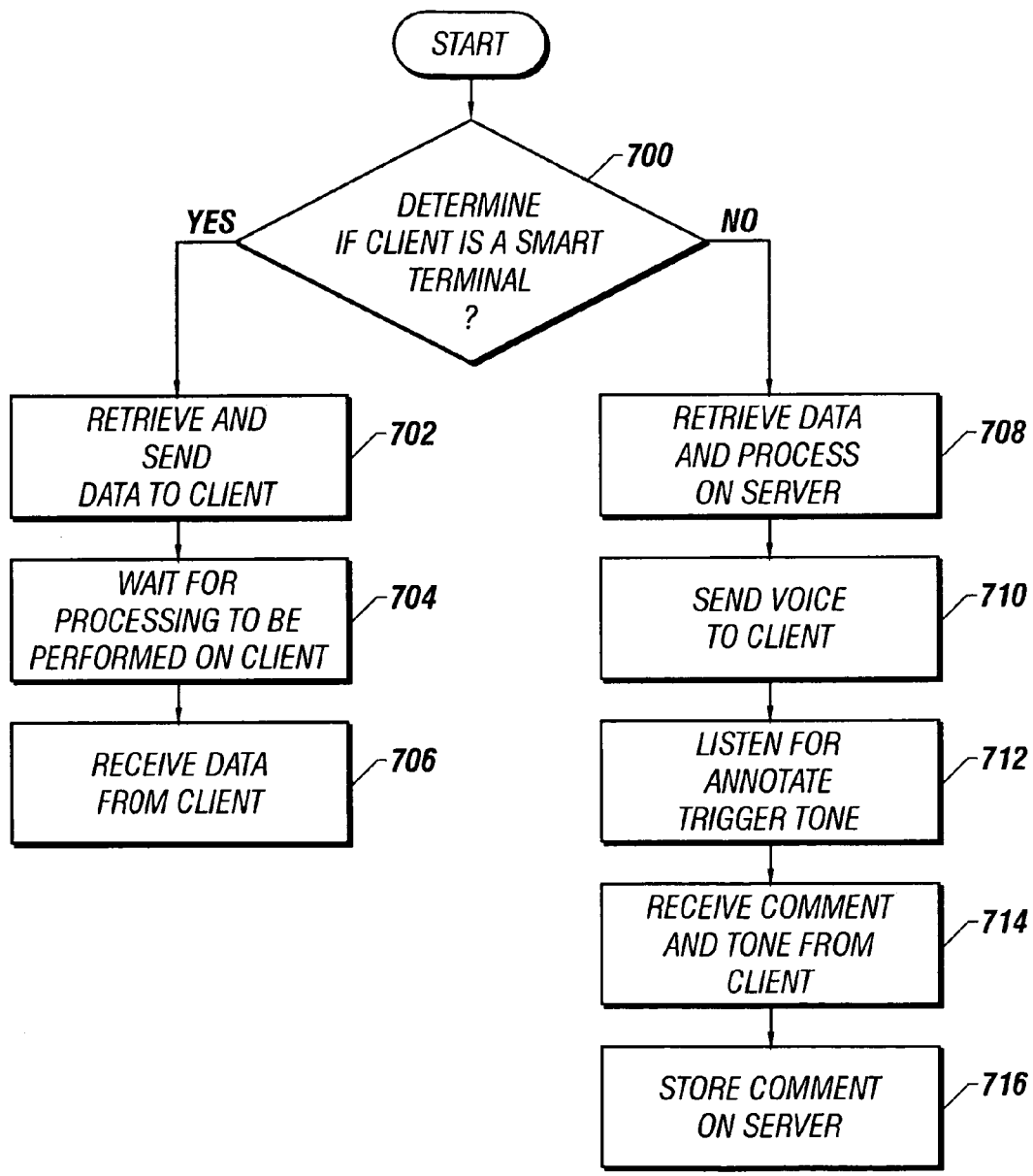
FIG. 7 illustrates the process utilized by an embodiment of the invention to allocate processing responsibilities depending on the processing power of the system utilized to listen to and obtain the document or comment data from a computer network.

FIG. 7 illustrates the process utilized by an embodiment of the invention to allocate processing responsibilities. The process illustrated begins at step 700 where a determination is made as to whether or not the system attempting to obtain text data from a network source for conversion to audio data and then subsequent playback to the user comprises a smart mobile device. If the system (e.g., the annotation device) comprises a smart mobile device, the network source, typically document server 402, retrieves the text data from memory (e.g., at step 702) and prepares and transmits the text data to the smart mobile device (e.g., at step 704). In one embodiment of the invention, the smart mobile device performs the annotating engine functions described above. For example, the type of processing performed at the smart mobile device typically comprises a text-to-speech operation that converts the text supplied from the network source into audio data that can be played to the user. Each portion of text may, for example, be processed utilizing Digital Signal Processing (DSP) techniques to enhance the quality of the audio data and/or encode the data into an audio format that the smart mobile system is capable of playing. The smart mobile device may for example, convert the text into an optimized Real Audio™ file (e.g., streaming media file) prior to playing the file to the user via an embedded or software Real Audio™ player. Once the processing is complete, the smart mobile device transmits some data back to the server (e.g., at step 706) for storage or further processing. For instance, if the user made a comment (e.g., at step 705), the smart mobile device may transmit the users comments as well as the location data associated with the comment back to the server for storage and/or processing purposes. The location data identifies where in relation to the text the user made a comment. The comment comprises the data inserted into the annotations file. It is important to note that the smart mobile device may also send other types of data back to the server for security or authentication purpose. The invention also contemplates the transmission of other types of data needed to maintain the link between the data sources and the smart mobile device.

In the instances where the outcome of step 700 indicates that the system connected to the data source is not a smart mobile device, but is rather a device which contains minimal or non processing capacity (e.g., a payphone or land line phone), the processing may be performed on a computer that has a higher capacity for processing data. Such processing may be performed on the data source or on any other computer accessible via a computer network. The computer tasked with performing such processing obtains the data and then converts the text file into an audio file (e.g., at step 708). The processing performed may also contain routines for optimizing the quality of the audio file in view of the device the file is going to be transmitted to. Once the text file is processed, the audio data can be transmitted to the device associated with the user (e.g., step 710). If, for example, the user is at a payphone or some other type of telecommunications device that does not have a mechanism for processing data, the audio file created by the server is transmitted to the user at the telecommunications device via the telephone network. The system tasked with performing the processing listens while it is playing back the document to the client for some form of command to start receiving comments (e.g. at step 712). If the user wishes to insert a comment into the document the user may generate a tone or some other sound via a telephone keypad or some other mechanism capable of generating a sound. In one embodiment of the invention, the user may depress a key (e.g., a number such as 1) or a simple verbal statement such as "insert comment" to indicate a desire to make a comment. Once the system receives the audible command, the system stops transmitting audio data and enters a listening mode. When the system is in a listening mode it picks up any verbal input (e.g., comments or annotations) provided by the user (e.g., at step 714). The system marks the location associated with the user comment and associates the comment with the document the user is commenting about. Once the user finishes providing the comment the system stores the comment in the annotations file for later access. The system may determine that the user has finished commenting when the user is silent for a certain threshold period of time (e.g., 30 seconds, 45 second, 1 minute, etc. . . . ) or when the user indicates the comment is complete by depressing a key or button on the device that cause an audible noise to be generated.

Smart Client Configuration

Figure 8:
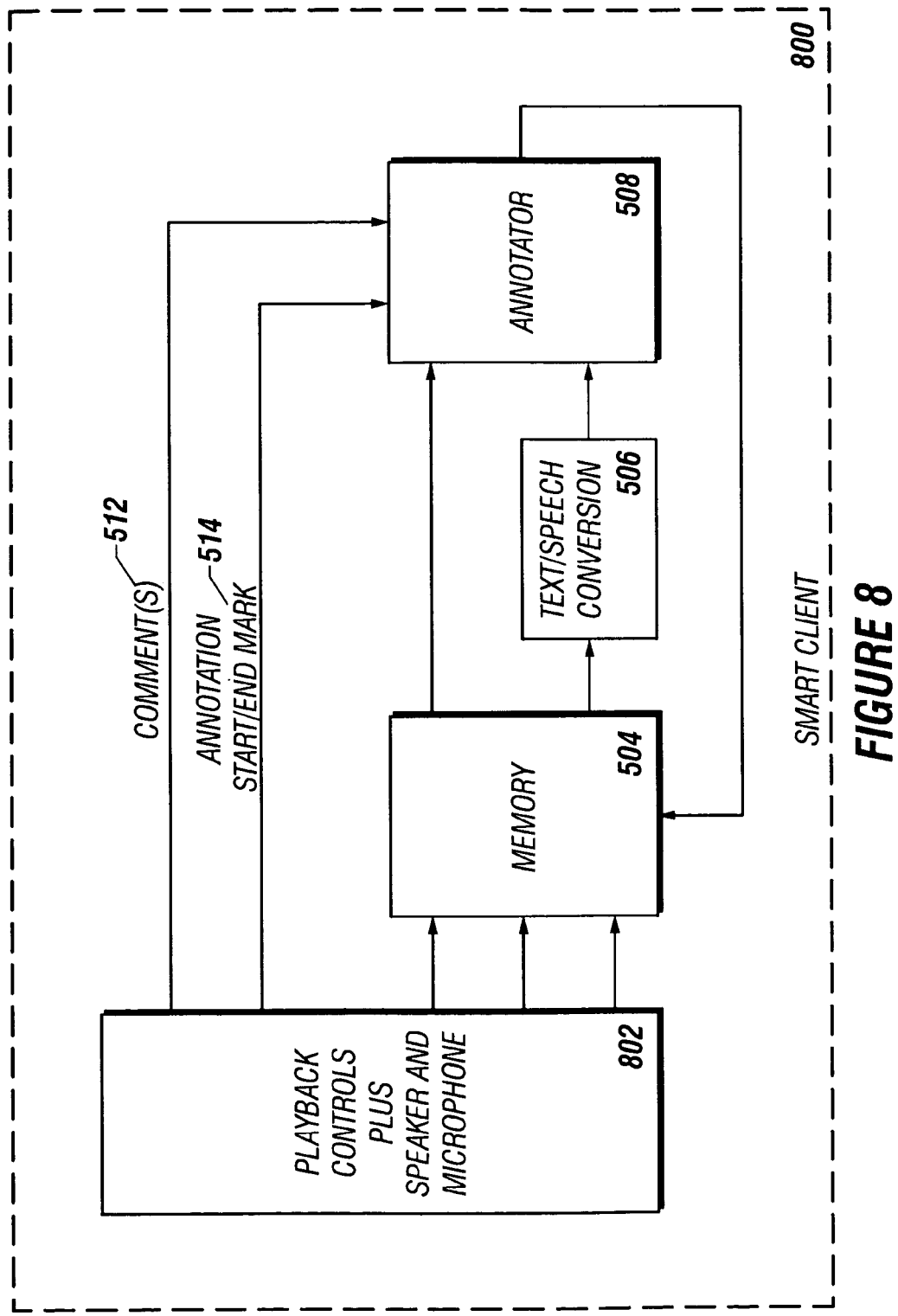
FIG. 8 is a schematic of a smart client configuration in accordance with an embodiment of the present invention.

FIG. 8 comprises a schematic of a smart client configuration in accordance with an embodiment of the present invention. As used herein, the smart client possesses processing power and control functions adequate to perform the processing required for the present invention. As shown in FIG. 8, smart client 800 encapsulates playback controls 802, memory 504, text/speech conversion 506, and annotator 508 functions. In one or more embodiments, memory 504 may be a removable storage media. In other embodiments, memory 504 is memory device such as random access memory, flash memory, optical memory, etc. For example, a wireless device such as a cellular phone may employ random access memory for temporary storage of the document transmitted as text messages via the wireless application protocol or any similar protocol.

Playback control function 802 is provided by controls available on the smart device. Block 802 also encompasses a speaker and microphone for audio input/output. In the instance where the smart device is a computer terminal, the keyboard functions may provide the controls required for control of document playback, navigation, and annotation. The smart device may be a device built specifically to provide the control functions (e.g. buttons or by use of voice commands) for practicing the present invention. In instances where a cellular phone is used, the keypad may provide the necessary controls for playback.

In one or more embodiments of the present invention, the text/speech conversion block 506 and annotator 508 may be provided as objects from the server to client 800 in the form of Java applets at log in. Java applets are executable objects in the form of bytecodes that are runtime compiled and executed by a Java Virtual Machine (JVM). In the case of a smart device with small footprint (i.e. limited processing power and memory), a "K" Virtual Machine (KVM) compiles and executes the applets. The use of Java applets or other form of machine independent code provides the flexibility to perform the processes of the present invention on any smart device with a Virtual Machine.

The Process Utilized by Smart Mobile Device with Limited Memory

Figure 9:
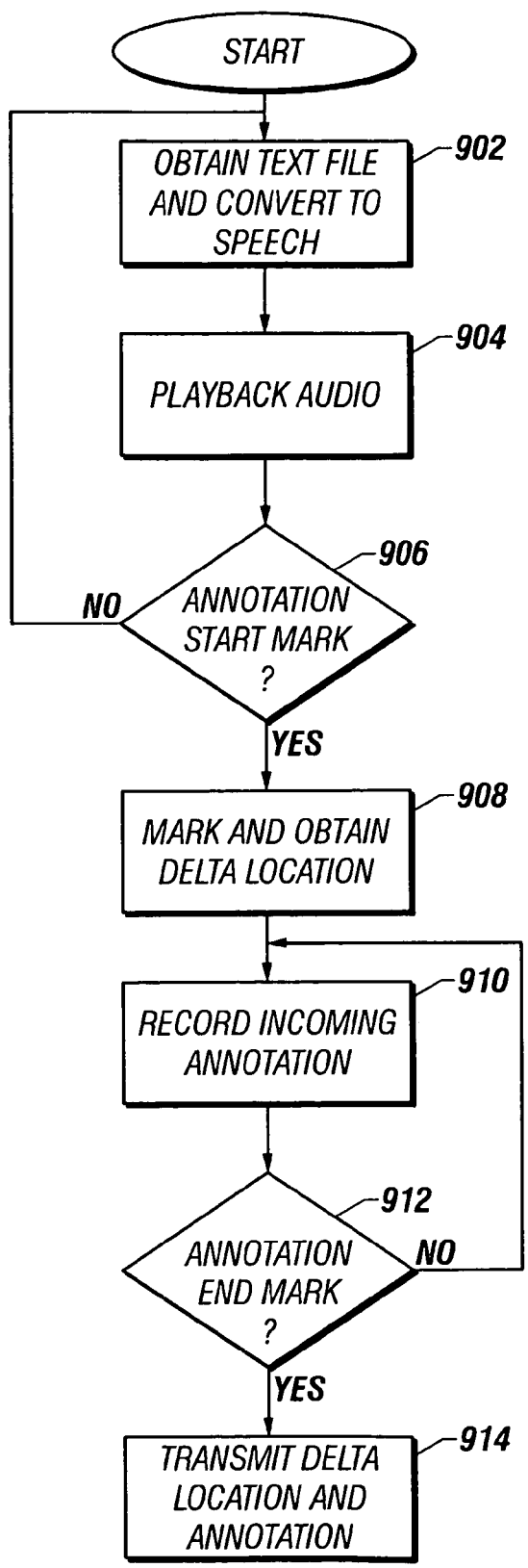
FIG. 9 illustrates the process utilized in accordance with one embodiment of the invention to annotate a document on a smart device with limited memory such that document data from the server is sent in packets to the smart client.

FIG. 9 illustrates the process utilized in accordance with one embodiment of the invention to annotate a document on a smart device with limited memory such that document data from the server is sent in packets to the smart client. For example, a wireless device utilizing the Wireless Application Protocol may receive the document in data packets for processing. Other device that are connected to the Internet may utilize protocols such as TCP/IP, UDP, or any other protocol that can encapsulate the contents of the document that is to be commented upon.

The processing performed by the smart device initiates at step 902 where the system obtains a text document and converts the text to audio data. For instance, at step 902 data packets transmitted to the device are processed and converted to speech for playback at step 904. If at step 906 an indication is received to start annotation, processing proceeds to step 908. Indication to start annotation may take any of the form described above such as a tone generated by a key entry or a voice command. Otherwise, playback continues with the process returning back to step 902 to receive more packets of data and continue until playback is complete or a start annotation indication is received.

If a start annotation mark (e.g., an annotation trigger) is received, playback is suspended. At step 908, the current location (i.e. delta location when referring back to the range of the data sent in the data packet under playback in relationship to the original document file) corresponding to the offset in the data packet being processed is noted and the annotator starts recording the annotation at step 910.

At step 912, a determination is made whether a stop annotation trigger indication is received. Stop annotation trigger may be generated in any of the forms described above such as a keypad input or voice command. If the trigger to stop annotation is received, processing proceeds to step 914. Otherwise, the annotator continues recording the incoming comments. At step 914, the delta location, which in one embodiment of the invention comprises the location in the current data packet under playback where the start annotation trigger was received, and the recorded annotation is transmitted to the document server using any desirable protocol. At the document server, the actual document location is determined by adding the offset (i.e. delta location) to the value of the location corresponding to the beginning of the data packet being processed. In one embodiment of the invention, the document server keeps track of the range of data sent in the data packet being processed. Thus, the document server and the annotation device work in connection with each other to identify the appropriate place in the document to insert comments while still synchronizing playback of the document. Processing continues at step 902 until the entire document has been processed or until the user suspends further processing.

Thin-Client Configuration

Figure 10:
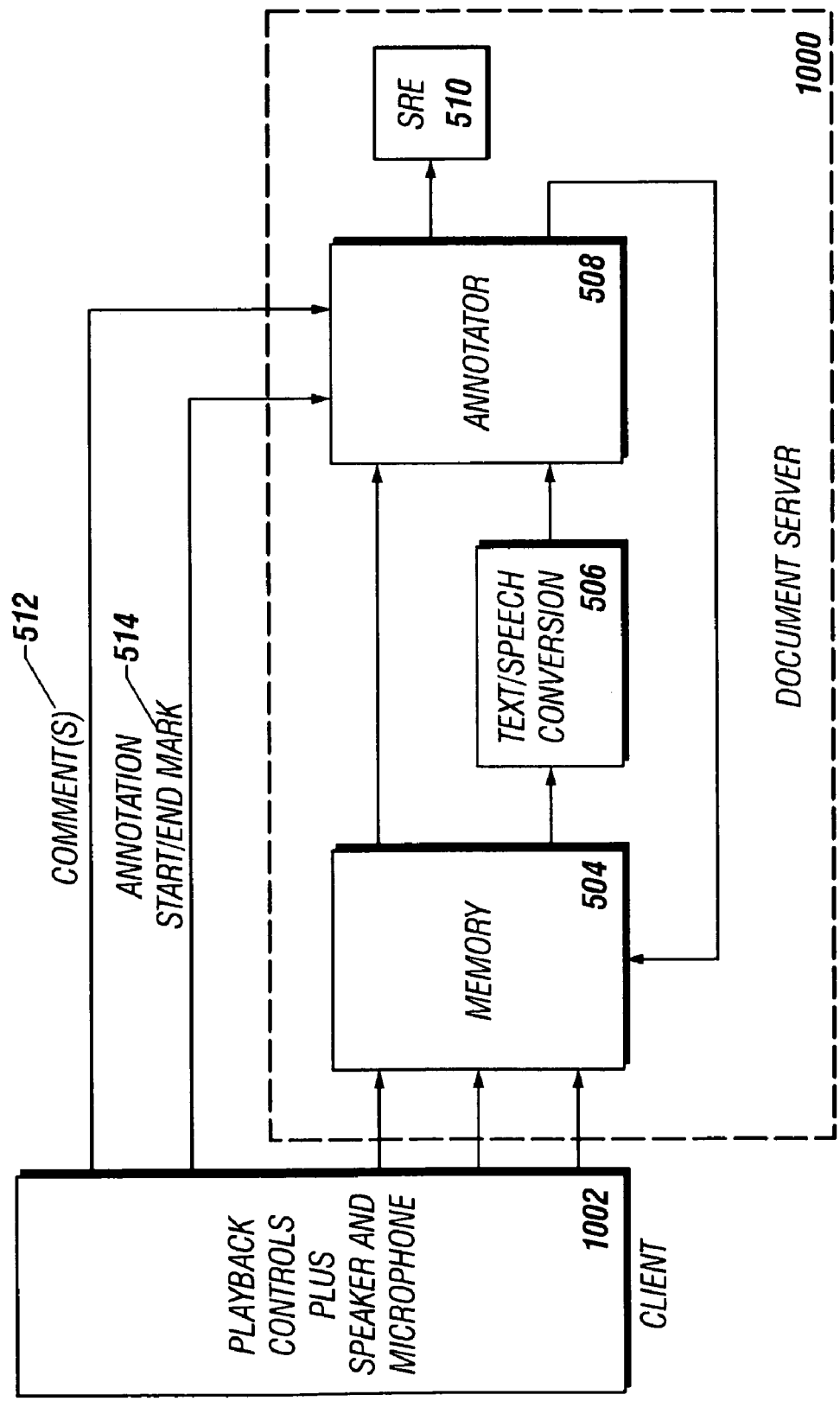
FIG. 10 shows a schematic of the thin client configuration according to one embodiment of the present invention.

FIG. 10 shows a schematic of the thin-client configuration according to one embodiment of the present invention. A user may access the present invention in the thin-client configuration. The thin-client configuration generally implies that little or no processing is performed at the client terminal. This is generally the case where a user accesses the system through a device like a land telephone or similar devices without sufficient processing power to handle the requirements of annotating engine 500 of FIG. 5.

Any device capable of accessing document server 402 (FIG. 4) may be used in the thin-client configuration if the user desires to perform some portion of the processing on the document server. For instance a smart client may be used in the thin-client configuration. Any time the user desires that the bulk of the processing be performed on document server 402, the thin-client configuration can be utilized. For example, network traffic considerations may require that a smart-client use a thin-client configuration and thereby perform processing on the server.

In the thin-client configuration, processes represented in block 1000 are performed on document server 402. The thin-client 1002 may perform limited processing such as generating of playback commands, transmitting and receiving voice commands, generating the annotation start mark command, etc. For example, where a telephone is used as a client, the keypad buttons may be used for the necessary playback commands. The telephone keypad provides convenient functions for playback control for example, the "#" key may be used as Fast Forward, the "*" key may be used as Rewind, and the numeric keys may be used for other functions. The thin-client may utilize any set of one or more keys to control the various types of playback functions.

FIG. 11 is a flow diagram of the processes performed by the document server when interacting with a thin-client device configured to perform annotating. After authentication of the user by the server and document to be played back is retrieved, playback starts at step 1101. For example, the user may be listening to the document through the earpiece of a telephone set. When the playback reaches a point where the user wants to add a comment, the user presses a button designated as the annotate button. This button generates an annotation mark in the form of a tone. In one embodiment of the invention, the annotation mark is referred to as an annotation start mark or an annotation trigger. Playback continues at step 1101 if the server does not receive an annotation start mark. However, if the server receives the annotation start mark at step 1102, it proceeds to step 1103 to synchronize the mark with the server file being played back. Synchronization may take multiple forms. For example, one embodiment may require synchronization back to the beginning of a sentence. Synchronization may also be at the beginning of a sentence since one can assume that a user does not typically want to insert a comment in the middle of a word. However, in some instances the system may allow the user to insert comment in the middle of a word (e.g., to correct the word or add a new word).

At step 1104, the server records the incoming voice comments from the thin client. Recording continues at step 1104 until another annotation mark (e.g., an end annotation mark) is received to signal the end of user comment at step 1105. If the end annotation mark is received, processing continues at step 1106. In one embodiment, the end annotation mark is triggered by a certain period of silence. At the end of recordation of the comments, the data is saved at step 1106 and playback resumes at step 1101 until end of the document is reached or the user indicates a desire to stop the playback. Stop playback may be indicated by simply hanging-up the handset, or the use of a button designated to stop the playback function.

File Structure

Figure 12:
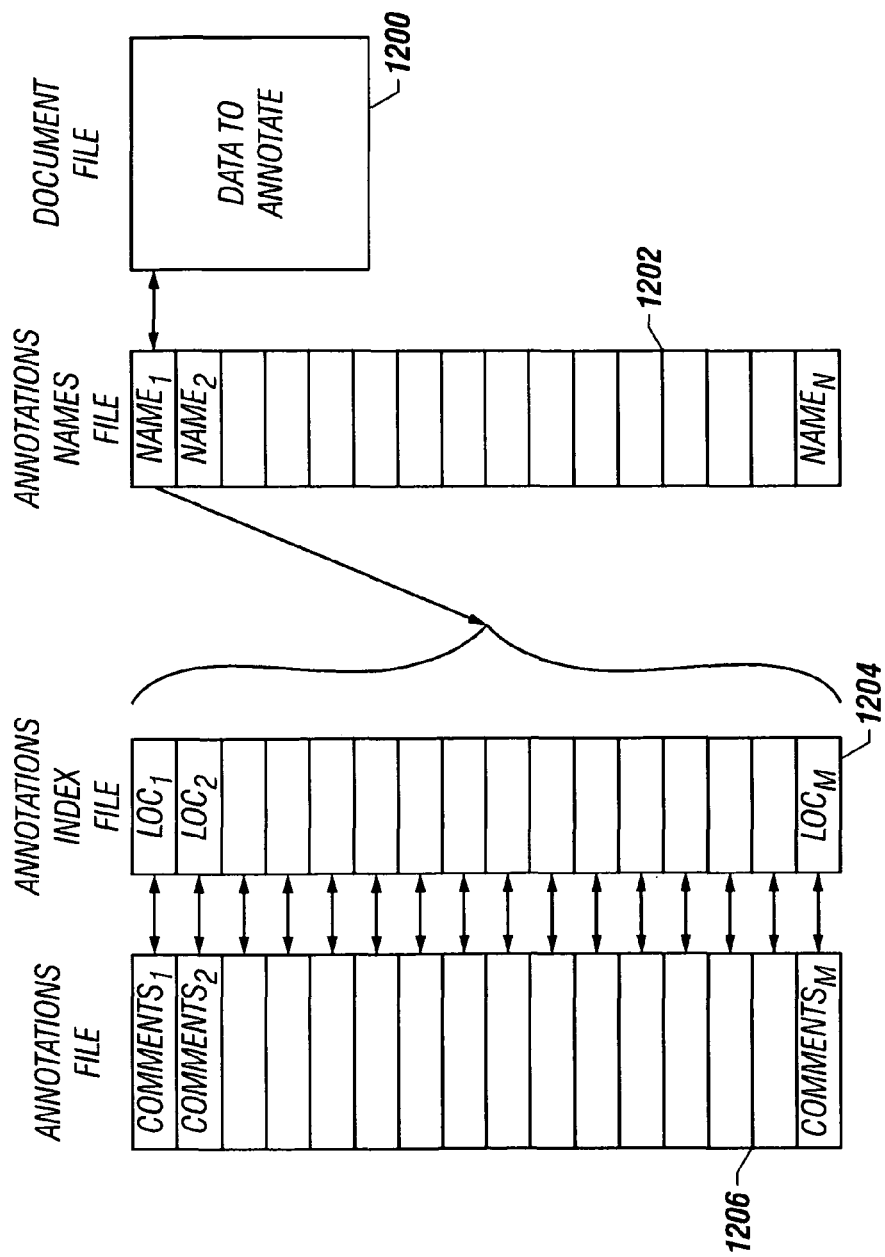
FIG. 12 shows a file structure for storing the annotations in accordance with an embodiment of the present invention.

In one or more embodiments, there are four basic files associated with the annotation of a document as shown in FIG. 12. These files comprise the original document 1200 (i.e., the document to be annotated). The Annotations Names File 1202, the Annotations Index File 1204, and the Annotations File 1206.

Document File 1200 comprises the document to be annotated and is not typically modified during annotation. Document file 1200 can also represent a previous annotation (comment) to another document. For example, a user may want to add comments to another user's comments. By adding comments to previous comments, a hierarchy of files and links is created. For example, for each document being annotated a trio of associations files (e.g., the annotations names file, annotations index file, and annotations file) are created. The result is a hierarchical tree of files with a root at the original document as shown in FIG. 13.

Figure 13:
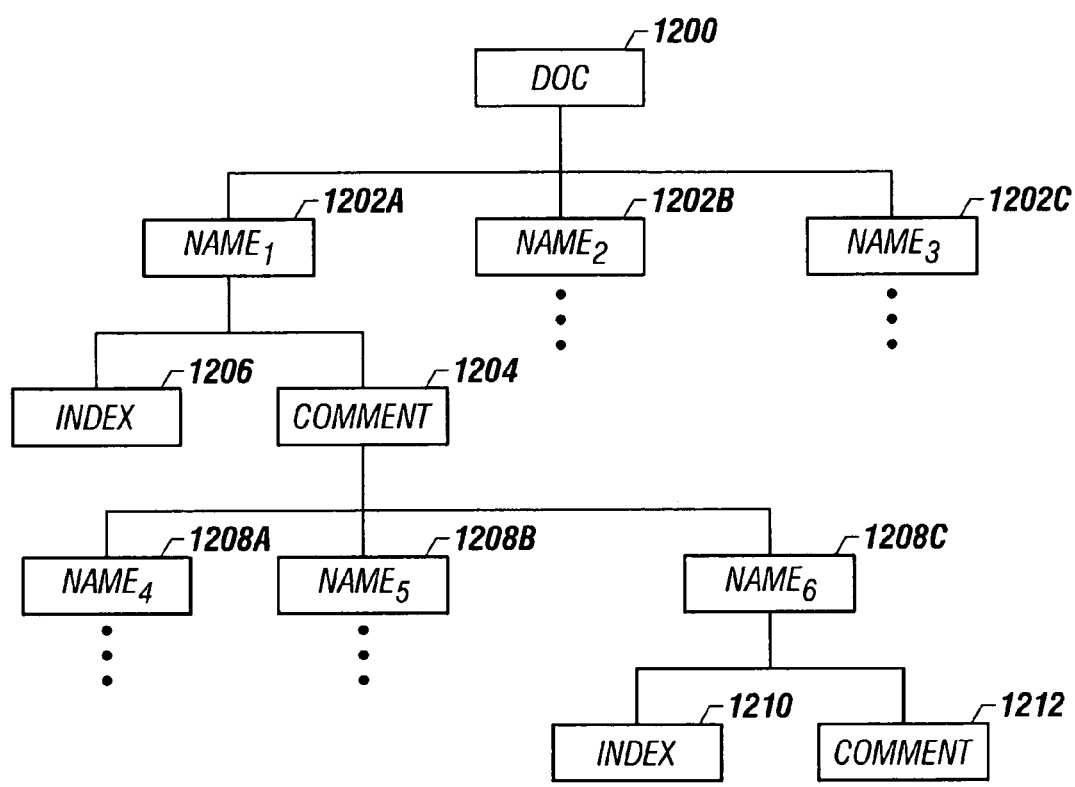
FIG. 13 is an illustration of the hierarchical tree structure of the file storage system in accordance with an embodiment of the present invention.

In FIG. 13, root node 1300 is the original document. The original document may be a book or a movie script, for example. As comments are added to the original document, the annotations names file represented as nodes 1302A-C, annotations index file node 1306, and annotations file node 1304 are created. In one or more embodiments, the comments contained in annotations file 1304 may be annotated thereby creating the children files represented in nodes 1308A-C, 1310, and 1312. Comment 1304 is an annotation by $NAME_1$ 1302A on the contents of document 1300 whereas comment 1312 is the annotation by $NAME_6$ 1308C on the comments made by $NAME_1$ 1302A on document 1300.

Comments 1304 represent a comment in annotations file 1206 for the first level of annotations of the original document. As structured, a second user may comment on any comment in annotations file 1206 made by a previous user. Therefore, it is possible to have a series of comment 1304 at the same level serving as intermediate nodes to additional comments.

Following the model discussed above, grandchildren and great-grandchildren nodes may be added to the hierarchical tree of annotations. The use of a hierarchical tree in this form makes it possible to add comments upon comments to any desired level, limited only by the memory capacity of the server, while still maintaining the ability to trace back to the original document. With this tree structure, it is possible to traverse the hierarchical tree to review selective comments using a sophisticated playback controller and annotating engine as described in this specification.

Referring back to FIG. 12, the annotations names file 1202 contains the identities of the users annotating the document. As discussed above, this document could be a previous comment (i.e. annotation) by another or the same user. In one or more embodiments, a series of alphanumeric characters may be employed for user identification. It is preferable to have unique identification for each user of the system however unique identification is not required. Using unique identifications make it easy to track sources of comments.

There is an annotations index file 1204 for each user (e.g., $NAME_1$) in the annotations names file 1202. For example, if there are "N" names in the annotations names file 1202, there will be "N" corresponding annotations index files 1204. Each location (e.g., $LOC_1$) in the annotations index file 1204 contains the location in document file 1200 where a comment is to be inserted, and the location of the comment in the annotations file 1206. That is, each location in the annotations index file 1204 contains two pieces of information. For each location in the annotations index file 1204, there is a location in annotations file 1206 comprising the corresponding user comment.

Using the file structure presented in FIG. 12 provides a method of infinitely storing and tracking the annotations (i.e. comments) made to an original document. Although the file structure described herein is desirable for ease of growth and traversal, however it would be obvious to those of ordinary skill that other file structures may be employed so long as it is conducive to retrieval of user annotations.

Once the comments are stored in the file structure they may be reconstructed upon request by a user. A user may, for example, provide the annotated document to a secretary or some other person in order to finalize the document. In other instances the document is stored for later processing by another person. A description of a general-purpose computer environment that may be utilized to implement various portions of the invention follows.

Embodiment of General Purpose Computer Environment

Figure 14:
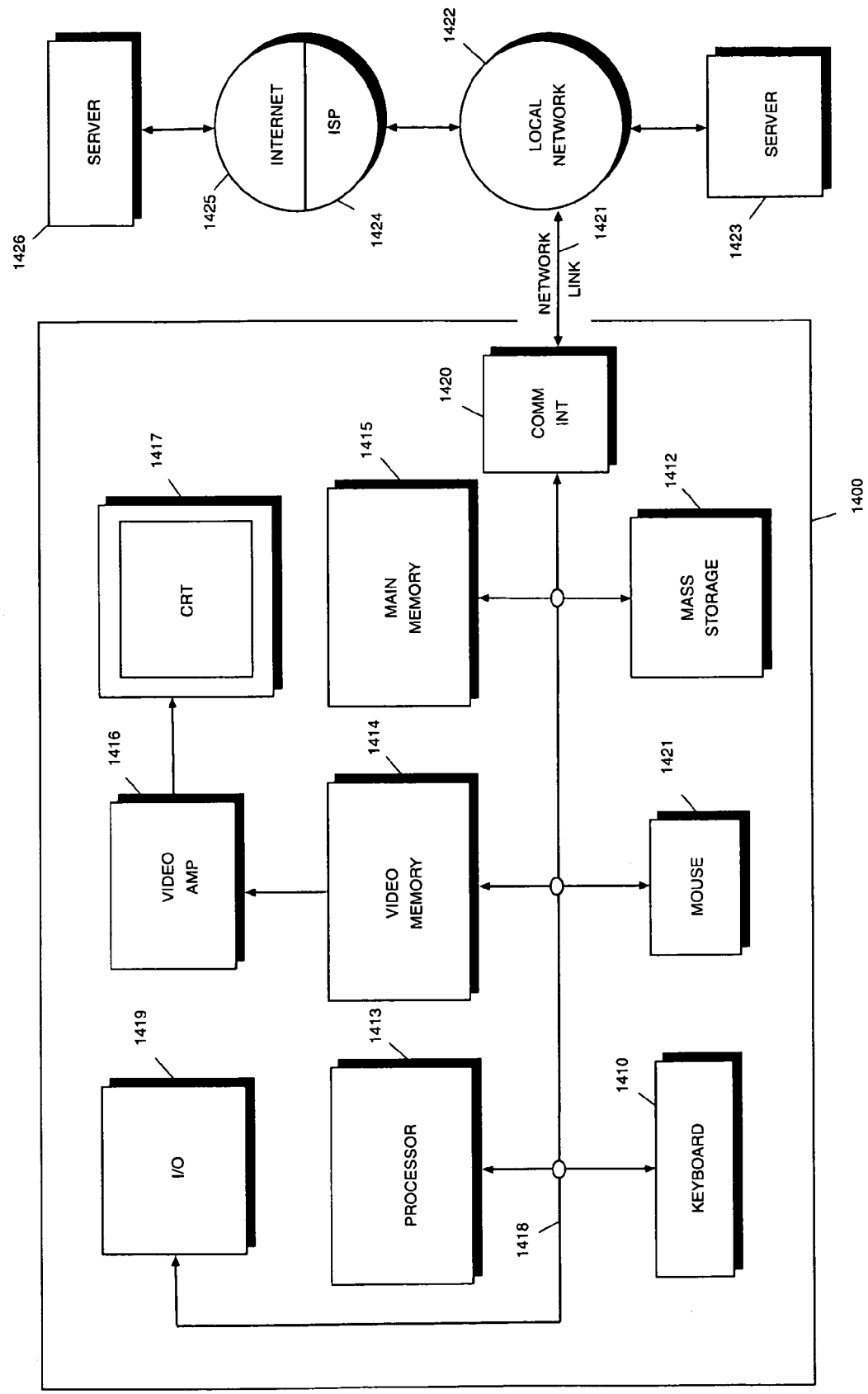
FIG. 14 shows a general-purpose hardware environment utilized to implement one or more embodiments of the invention.

An embodiment of the invention can be implemented as computer software in the form of computer readable program code executed on one or more general-purpose computers such as the computer 1400 illustrated in FIG. 14. A keyboard 1410 and mouse 1411 are coupled to a bi-directional system bus 1418 (e.g., PCI, ISA or other similar architecture). The keyboard and mouse are for introducing user input to the computer system and communicating that user input to central processing unit (CPU) 1413. Other suitable input devices may be used in addition to, or in place of, the mouse 1411 and keyboard 1410. I/O (input/output) unit 1419 coupled to bi-directional system bus 1418 represents possible output devices such as a printer or an A/V (audio/video) device.

Computer 1400 includes video memory 1414, main memory 1415, mass storage 1412, and communication interface 1420. All these devices are coupled to a bi-directional system bus 1418 along with keyboard 1410, mouse 1411 and CPU 1413. The mass storage 1412 may include both fixed and removable media, such as magnetic, optical or magnetic optical storage systems or any other available mass storage technology. The system bus 1418 provides a means for addressing video memory 1414 or main memory 1415. The system bus 1418 also provides a mechanism for the CPU to transferring data between and among the components, such as main memory 1415, video memory 1414 and mass storage 1412.

In one embodiment of the invention, the CPU 1413 is a microprocessor manufactured by Motorola, such as the 680X0 processor, an Intel Pentium III processor, or an UltraSparc processor from Sun Microsystems. However, any other suitable processor or computer may be utilized. Video memory 1414 is a dual ported video random access memory. One port of the video memory 1414 is coupled to video accelerator 1416. The video accelerator device 1416 is used to drive a CRT (cathode ray tube), and LCD (Liquid Crystal Display), or TFT (Thin-Film Transistor) monitor 1417. The video accelerator 1416 is well known in the art and may be implemented by any suitable apparatus. This circuitry converts pixel data stored in video memory 1414 to a signal suitable for use by monitor 1417. The monitor 1417 is a type of monitor suitable for displaying graphic images.

The computer 1400 may also include a communication interface 1420 coupled to the system bus 1418. The communication interface 1420 provides a two-way data communication coupling via a network link 1421 to a network 1422. For example, if the communication interface 1420 is a modem, the communication interface 1420 provides a data communication connection to a corresponding type of telephone line, which comprises part of a network link 1421. If the communication interface 1420 is a Network Interface Card (NIC), communication interface 1420 provides a data communication connection via a network link 1421 to a compatible network. Physical network links can include Ethernet, wireless, fiber optic, and cable television type links. In any such implementation, communication interface 1420 sends and receives electrical, electromagnetic or optical signals which carry digital data streams representing various types of information.

The network link 1421 typically provides data communication through one or more networks to other data devices. For example, network link 1421 may provide a connection through local network 1422 to a host computer 1423 or to data equipment operated by an Internet Service Provider (ISP) 1424. ISP 1424 in turn provides data communication services through the worldwide packet data communication network now commonly referred to as the "Internet" 1425. Local network 1422 and Internet 1425 both use electrical, electromagnetic or optical signals that carry digital data streams to files. The signals through the various networks and the signals on network link 1421 and through communication interface 1420, which carry the digital data to and from computer 1400, are exemplary forms of carrier waves for transporting the digital information.

The computer 1400 can send messages and receive data, including program code, through the network(s), network link 1421, and communication interface 1420. In the Internet example, server 1426 might transmit a requested code for an application program through Internet 1425, ISP 1424, local network 1422 and communication interface 1420.

In one embodiment of the invention a thin-client device is configured to interface with the computer system described above via a computer network. In other instances (e.g., when a smart mobile device is utilized) some or all of the components discussed above are incorporated into the device. It will be evident to one of ordinary skill in the art that the computer systems described above are for purposes of example only. An embodiment of the invention may be implemented in any type of computer system or programming or processing environment.

Audio Annotation of Line-Based Documents

For annotating line-based documents (e.g., movie scripts, legal transcripts, etc.), one or more embodiments of the invention provide for line-based navigation of an audio representation of the document, as well as line-based association of audio annotations with the audio representation of the document. Thus, with an embodiment of the invention, a professional trained to annotate documents by line references may confidently and efficiently navigate and annotate an audio document by line, rather than relying solely on fast-forward and rewind audio functions.

Figure 15A:
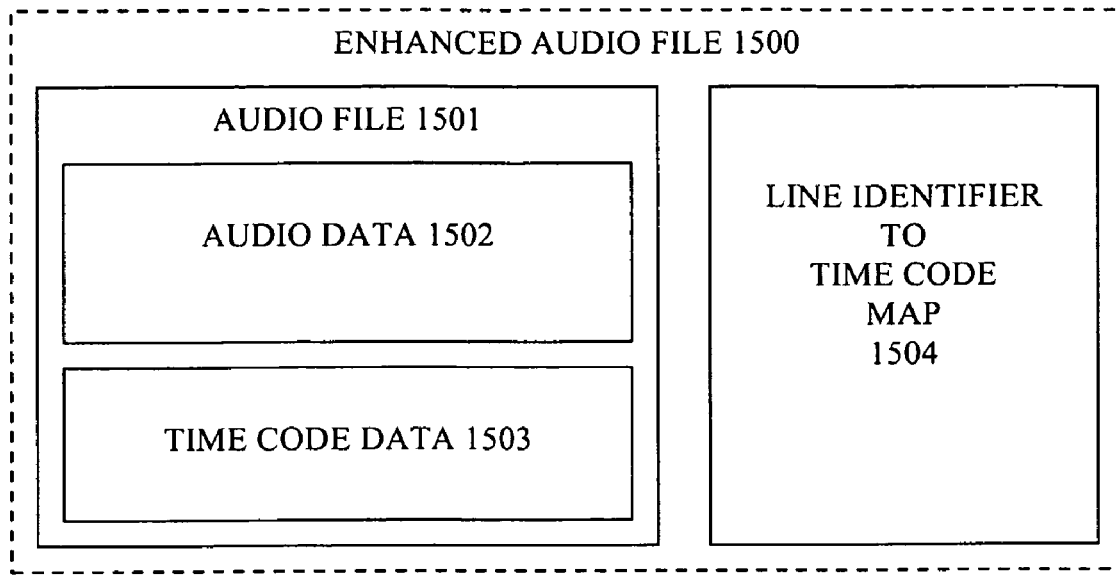
FIG. 15A is a block diagram of an enhanced audio file format having a line identifier-time code map, in accordance with one or more embodiments of the invention.

As illustrated in FIG. 15A, in one embodiment, the text document is transformed into an audio file 1501 (e.g., MP3, WAV or other audio file format), including audio data 1502 and time code data 1503. The audio data 1502 and the time code data 1504 are typically represented as parallel data channels.

Time codes may be implemented, for example, in the format "xx:yy:zz:ww", where "xx" represents hours, "yy" represents minutes, "zz" represents seconds, and "ww" represents some fractional units of a second (e.g., frames or samples). The number of frames or samples per second may vary with the audio format and/or sample rate used in the given implementation. In some embodiments, the time code data channel may have unused bits available (i.e., the bits needed to represent each time code do not fill each frame or sample slot in the data channel).

For the embodiment illustrated in FIG. 15A, an additional file or file component 1504 can be created that maps the text document line identifiers (e.g., line numbers) to the time codes or index values associated with the audio file. For example, the line identifier-time code map 1504 can be implemented as an XML list explicitly associating each line identifier with a corresponding audio time code value. The audio file 1501 and the line identifier-time code map 1504 may be associated together as elements of an enhanced audio file format 1500.

Figure 15B:
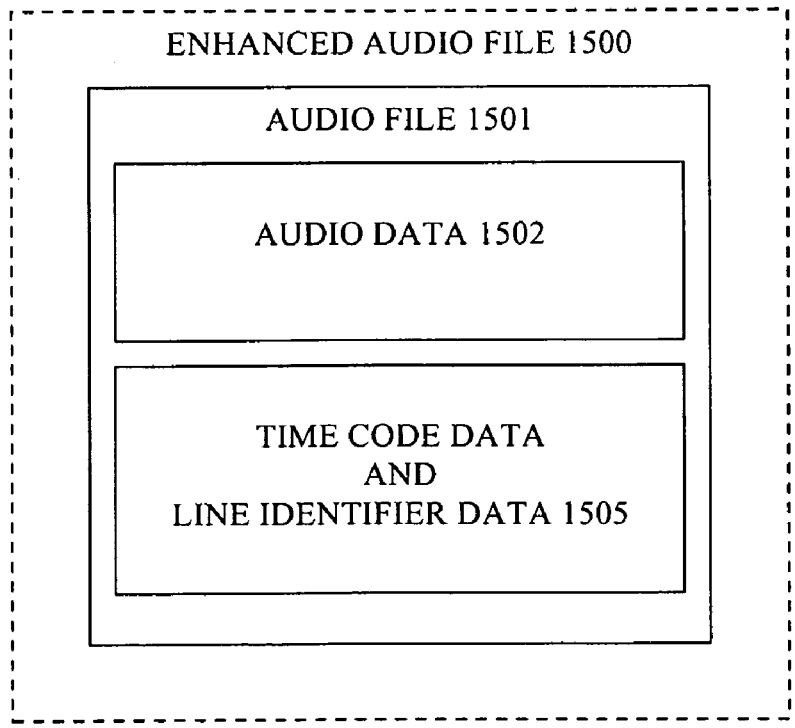
FIG. 15B is a block diagram of an enhanced audio file format having line identifiers embedded in a parallel data channel, in accordance with one or more embodiments of the invention.

In another embodiment, as illustrated in FIG. 15B, line identifiers may be embedded alongside respective time codes within the audio time code data channel 1505, where unused bits are available for this purpose; alternatively, an additional, parallel data channel may be established within audio file format 1500 for document line identifiers.

Because text-to-speech conversion can be a processor and memory intensive task, the quality of text-to-speech conversion on limited-resource devices can be unsatisfactory. One or more embodiments of the present invention avoid such unsatisfactory performance by performing the text-to-speech conversion on a server or host computer system to pre-generate enhanced audio files. The enhanced audio file 1500 (e.g., audio data 1501 plus line identifier-time code map 1504 or line identifier channel data 1505) may be written to a portable memory device (e.g., flash memory card) or downloaded for use in an annotation device having less extensive processor and memory resources (e.g., tablet PC, personal digital assistant (PDA), or onboard vehicle computer). Annotations may be stored in audio form and saved (e.g., in the same memory as the enhanced audio file) for later conversion to text (if desired) at the server or host computer.

In one or more embodiments, the text document is created as or converted into a hypertext mark-up language (HTML) or other general mark-up language (e.g., XML) document. During review of the document, the HTML document can then be displayed on a laptop PC, tablet PC or PDA device as the audio file is played. The line numbers for the display may be synchronized with the audio through the use of the line identifier-time code map 1504 (or line code data channel 1505) generated during the text-to-speech conversion process.

Figure 16:
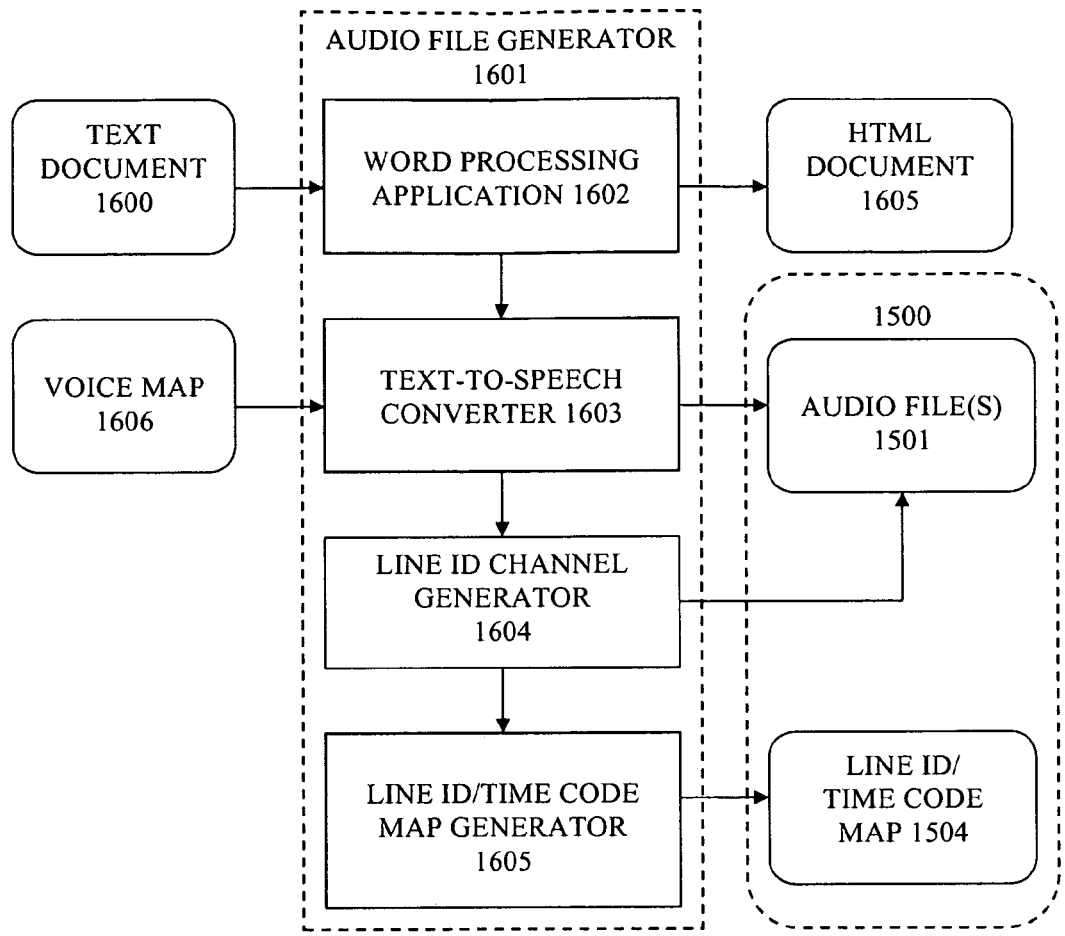
FIG. 16 is a block diagram of an apparatus for generating an enhanced audio file in accordance with one or more embodiments of the invention.

FIG. 16 is a block diagram of one possible embodiment of an apparatus for generating enhanced audio files 1500. As shown, audio file generator 1601 includes a word processing application 1602, a text-to-speech converter 1603, and line identifier channel generator 1604 or a line identifier/audio time code map generator 1605.

The original line-based document (e.g., script, transcript, etc.) is represented by text document 1600. Text document 1600 may be in any text form recognizable by application 1602, including text-only format or HTML, for example. Text document 1600 is read by word processing application 1602, within which various formatting operations may be performed to create HTML document 1605. One possible word processing application that may be used is the Word application published by Microsoft Corporation. For example, macros may be programmed within the word processing application to assist in making style assignments, as well as certain desired formatting operations (e.g., inserting line breaks to limit line length for small displays). For example, with respect to acronyms, a specific style may be assigned to acronyms, so that the text-to-speech converter recognizes such acronyms and spells them out appropriately.

Optionally, the voice(s) used in the text-to-speech conversion may be selected from a set of available voices based on a chosen style. For movie scripts or other documents where it may be advantageous to use multiple voices within a single document, different styles may be associated with different paragraphs or lines to specify which voice to use for which paragraph or line. A user may specify pre-existing styles for paragraphs in the line-based document to identify voices supported by the word processing application 1602. Alternatively, a user may specify his own style aliases for paragraphs and then provide a separate file 1606 that maps those style aliases to actual voices supported by the text-to-speech converter 1603. The user can thereby alter the voices used in the converter by editing one or more entries in voice map 1606 using any type of document editor.

Text-to-speech converter 1603 converts the text document into audio file 1501, applying the voices set forth within the paragraph styles of the text document, as well as any relevant mappings from voice map 1606. Converter 1603 may be configured to break the audio output into multiple audio files 1501 (e.g., sections or chapters) to uphold a size limit for individual audio files. Such a limit may be user-configurable. The size limit may be adjusted, for example, for optimum use of application memory resources in a target portable device.

In one or more embodiments, the audio file may be generated and saved at varying playback speeds (e.g., slow, normal, faster and fast, etc.), for the convenience of the reviewer. Manual and/or voice commands may then be implemented by which the reviewer can seamlessly switch between the available playback speeds (e.g., by switching between pre-generated audio files associated with the desired playback speeds). The reviewer may select the playback voice speed that matches the reviewer's own pace (including using the faster speed during playback of familiar or less important content). By having the text-to-speech conversion process pregenerate playback data for multiple speeds, the reviewer may avoid the voice distortion (e.g., chipmunk voice) that arises when the playback system implements rate adjustments on existing audio data. The multiple pregenerated copies of audio data (for multiple playback speeds) may be stored as different portions or channels of a single audio file 1501, or as separate audio files.

Referring again to FIG. 16, as converter 1603 is generating audio files 1501, line identifier (ID) channel generator 1604 may embed respective line identifiers into the audio time code channel or into a parallel data channel of audio file 1500. Alternatively (or additionally), line identifier/audio index map generator 1605 may generate line identifier/audio map file 1504. Map file 1504 may contain, for example, line ID/time code pairs associating the audio time code corresponding to the beginning of playback of a particular document line with the identifier (e.g., line number) for that particular line.

Figure 17:
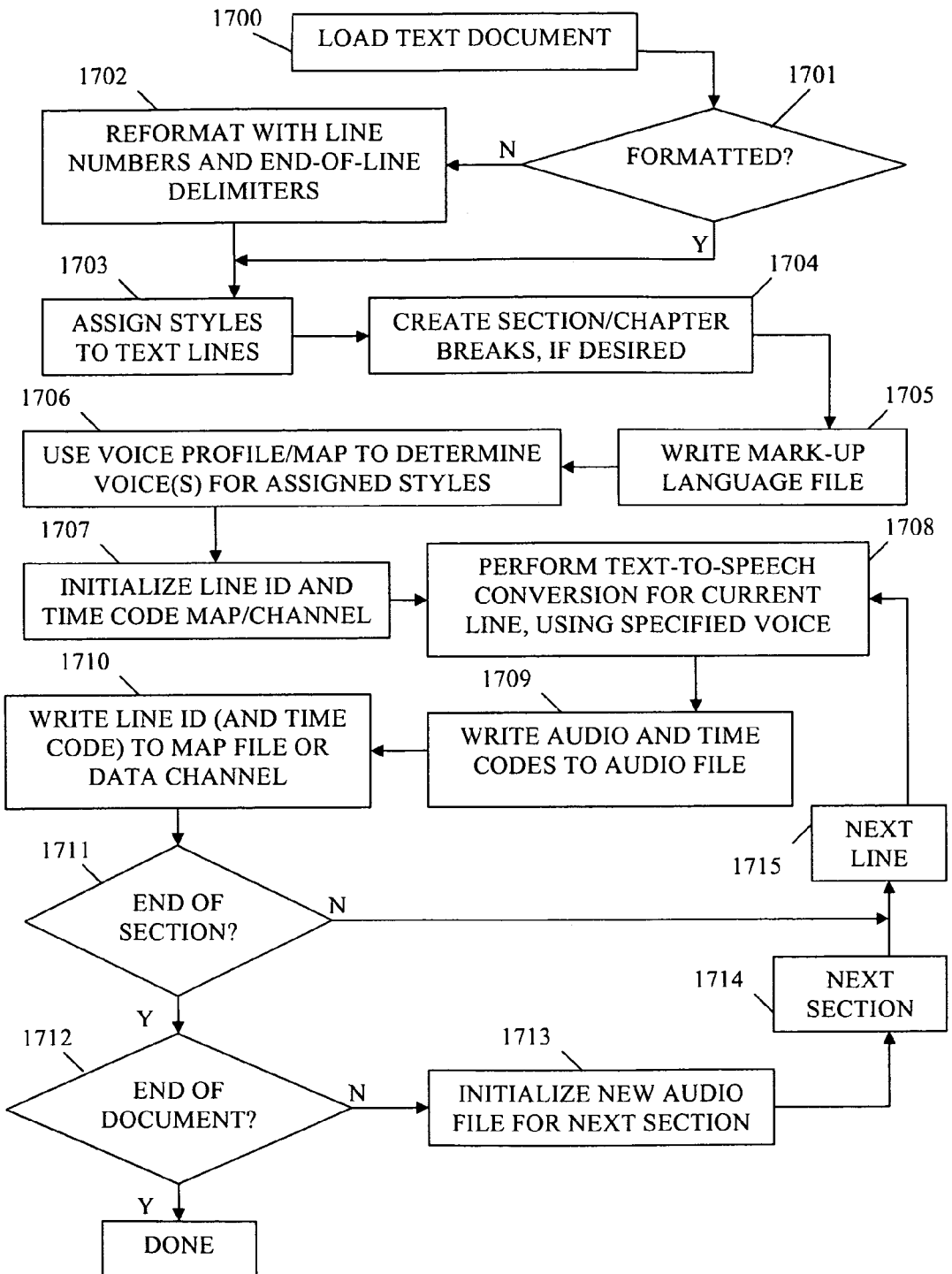
FIG. 17 is a flow diagram of a method for generating an enhanced audio file in accordance with one or more embodiments of the invention.

FIG. 17 is a flow diagram of a method for generating enhanced audio files (1500) in accordance with one or more embodiments of the invention. In block 1700, the line-based text document (1600) is loaded into the word processing application (1602). In block 1701, if the text document (1600) is not yet formatted with sufficient end-of-line delimiters (e.g., line breaks, paragraph breaks) and/or line identifiers, those elements may be added to the text document in block 1702. Otherwise, the method proceeds to block 1703.

In block 1703, the user may assign specific styles to paragraphs within the text document, to specify the voice to be used for the given paragraph during text-to-speech conversion. In block 1704, the user may optionally hardcode section or chapter breaks into the document (e.g., to instruct the text-to-speech converter where to begin a new audio file). In block 1705, the word processing application (1602) writes the formatted text as a mark-up language file (1605).

In block 1706, the text-to-speech converter determines which supported voices will be used in the conversion process, e.g., including accounting for any style aliases mapped in a voice profile map (1606). In one embodiment, a default voice profile map may be located in the directory where the converter application resides. A voice profile map provided in the directory with the text document overrides the default voice profile map. However, if no voice profile map is provided in the directory where the text document resides, then the default voice profile map is used.

In one embodiment, the voice profile map may be implemented as an XML file containing one or more tags that each specify a style name (voice alias) and a corresponding voice name the converter will recognize, e.g., in the format:

<voices>
    <voice name="voice name" style="style name"/>
    . . .
    </voices>

The XML voice profile map may be edited with any text editor.

In block 1707, the text-to-speech converter initializes the audio timing index (e.g., time code) for the first line identifier (e.g., line 1 corresponds to time $T_0$). In block 1708, the text-to-speech converter 1603 converts the current line into audio data, using the specified voice. The audio data and associated time code(s) are written to audio file 1501, in block 1709. In block 1710, the current line identifier (ID) and the associated time code may be recorded in map file 1504 (e.g., by map generator 1605), or the current line ID may be embedded into the time code data channel or a parallel data channel (e.g., by line ID channel generator 1604). It is noted that other embodiments of the invention may perform blocks 1708-1710 in parallel or in a different sequence than that shown in the example of FIG. 17.

In block 1711, if the text-to-speech converter detects a section break, the method branches to block 1712; otherwise, the method proceeds to block 1715 to advance to the next line of the document. In one or more embodiments, for example, the section break may take the form of an explicit section break indicator or end of file (EOF) indicator, and/or the section break may be created by the converter when a configurable audio file size limit is reached.

In block 1712, if the section break is an EOF indicator, the conversion is complete. If the section break is not an EOF indicator, the text-to-speech converter initializes a new audio file (1501) for the next section, in block 1713. In block 1714, the text-to-speech converter advances to the next section of the document, and advances to the first line of the next section in block 1715. After block 1715, the method returns to block 1708. For some embodiments in which a line-based document is represented as multiple audio files (e.g., multiple chapters and/or multiple playback speeds), a single, global line ID-time code map or map file may be generated, and/or individual line ID-time code maps may be generated for each audio file.

Once HTML document file 1605 and enhanced audio file 1500 (comprising audio file(s) 1501 and line ID/audio map 1504 or line ID data 1505) are generated, those files may be transmitted to the memory of an annotation device or saved to a portable memory device (e.g., a flash memory card) that interfaces with the annotation device.

Figure 18:
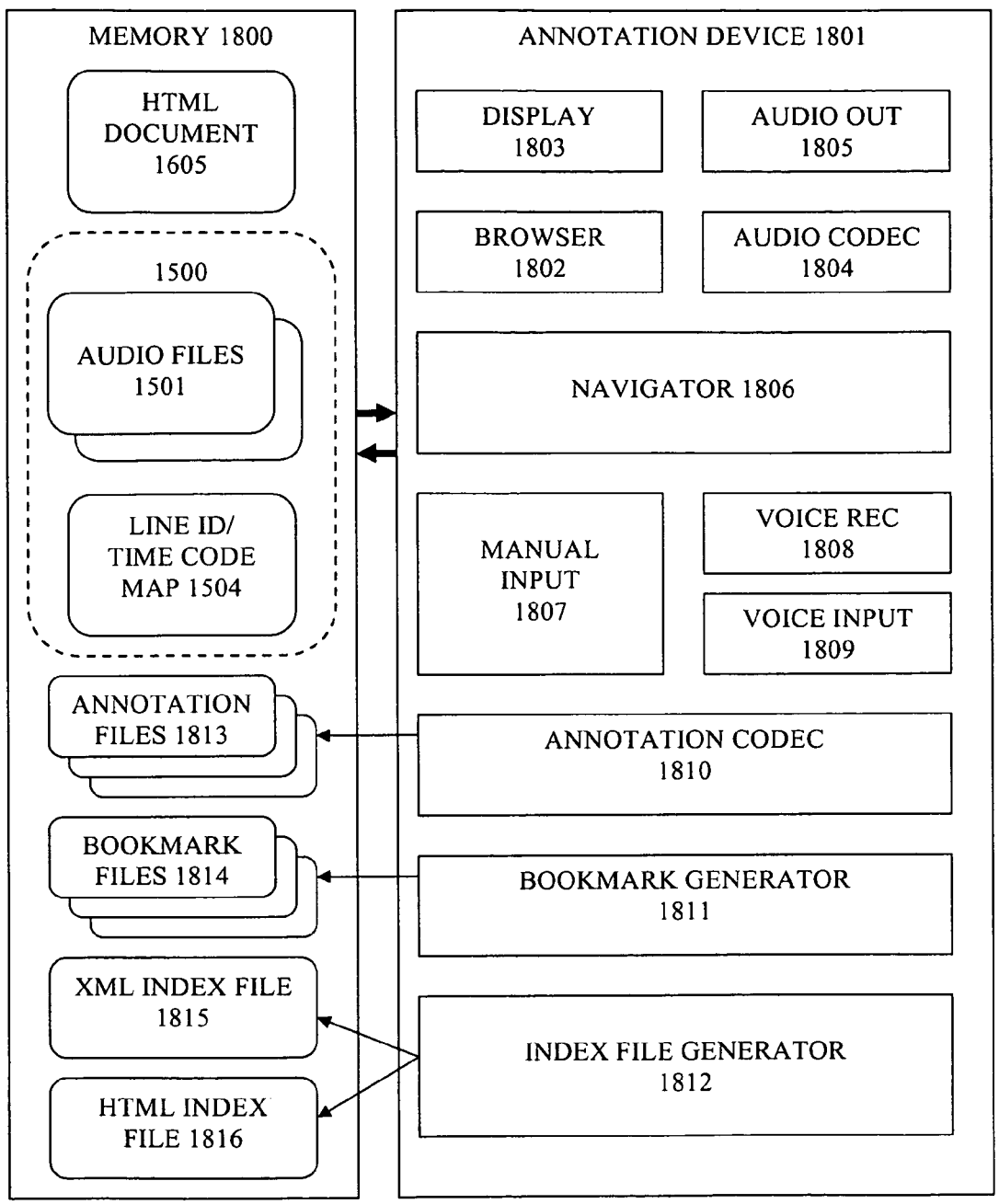
FIG. 18 is a block diagram of an annotation system using audio files for presentation of the document for annotation, in accordance with one or more embodiments of the invention.

FIG. 18 is a block diagram of an annotation device configured to use the enhanced audio files, in accordance with one or more embodiments of the invention. The specific hardware of the annotation device will depend upon whether the device is a laptop or tablet PC, a PDA, or a dedicated annotation device. In most embodiments, the components shown within annotation device 1801 (with the possible exceptions of the input and output hardware) may be implemented in software executed by the device processor. In other embodiments, some or all of those components may be implemented directly with hardware circuitry. Also, though the device functions are shown as separate components in FIG. 18 for ease of discussion, those functions need not be segregated within the actual implementation of the device.

In FIG. 18, annotation device 1801 is coupled to memory 1800. Memory 1800 may be internal memory of device 1801 or memory 1800 may be attachable memory, such as a flash memory card. Memory 1800 is shown with HTML document file 1605 and enhanced audio file 1500, which may both be used by annotation device 1801 as input data. In addition, memory 1800 includes annotation files 1813, bookmark files 1814 and annotation/bookmark index file 1815, each of which may be generated as output files as the document review proceeds.

Annotation device 1801 includes a browser 1802 and display 1803 for presenting portions of HTML document 1605 centered on the current line under review. The extent of the document displayed will vary based on the size of the device display 1803. For example, in the relatively small display of a PDA device, the current line may be displayed in enlarged text, with portions of the preceding and subsequent lines shown in smaller text for visual context purposes. It is also possible in some audio-only embodiments to omit the display of any portion of the document.

Annotation device also includes audio codec 1804 and audio out 1805 for decoding/decompressing the audio data from files 1501 and presenting the resulting audio signal to the user/document reviewer. Multiple audio codecs may be provided to support multiple audio data formats (e.g., MP3, WAV, etc.). Audio out 1805 may be a speaker within the device itself or an audio output port for connection to an external sound system or headphones.

Navigator 1806 uses the line ID/audio map 1504 to synchronize the current display line with the audio playback of codec 1804. Further, navigator 1806 responds to navigation commands to pause/resume playback, and to synchronously navigate forward and backward through HTML document 1605 and audio files 1501. For annotation playback or bookmark goto commands, navigator 1806 accesses annotation/bookmark index file 1815 to determine the new line to display (if the line changes) and the annotation file to play (if appropriate). The audio file 1500 provides the information used to determine the respective audio time code for a given line number.

Manual input 1807 may include buttons, a touch screen, etc. for selecting commands. Also, a press-to-talk (PTT) button may be provided to trigger voice recognition and/or to start and stop recording of annotations.

Voice input 1809 may represent an internal microphone or a port for connection to an external audio input device. Voice recognition function 1808 interprets voice input and notifies navigator 1806 of any detected commands. Commands to generate annotations or bookmarks are handled by annotation codec 1810 or bookmark generator 1811, respectively. Voice recognition may be continuous, or it may be triggered by the PTT button.

Annotation codec 1810 receives "make annotation" commands, records the subsequent annotation, and converts the recorded annotation into an audio annotation file 1813. In one embodiment, the individual audio annotation files are saved using a naming convention to associate each annotation to a line of the document. For example, each new annotation may be named according to the following format: "ANNXX_YY", where XX is the document line number where the annotation occurs, and YY is the annotation number (or vice versa). The names of the annotations files can thus be quickly searched and indexed. Other indices may similarly be represented in the names of annotation files, such as an identifier of the particular annotator, etc. The date of annotation may also be included in the file name or it may be obtained directly from creation date information of the file.

A bookmarking function may also be implemented by bookmark generator 1811 to allow the person reviewing the document to save specific locations or "bookmarks" in the document. For line-based documents, the resulting bookmark file 1814 may consist of data representing the line identifier and/or time code corresponding to the line under review (i.e., being played back) at the time the bookmark command is invoked (e.g., as a voice command, button selection, etc.). In one embodiment, bookmarks may be stored as separate files using a naming convention similar to that disclosed above for annotations. For example, a line identifier may be stored in a file named "BKMXX_YY", where XX is the line number of the bookmark and YY is a number assigned to a given bookmark.

In one or more embodiments, bookmarks may be assigned numbers in sequence as the bookmarks are created, though other numbering or identifying schemes may be used to identify individual bookmarks. Where multiple reviewers are involved, a reviewer identifier may be used as part of the bookmark file name to permit filename sorting or indexing of bookmarks by individual reviewer. Where applicable, chapter numbers or other section labels may also be included in the filename of a bookmark or annotation.

Index file generator 1812 creates and maintains annotation/bookmark index file 1815 (e.g., as an XML file). If no index file 1815 exists at the beginning of the review session (e.g., during document loading) generator 1812 will search for existing annotation files 1813 and bookmark files 1814 to create a new index file 1815. Further, whenever an annotation or bookmark is created/deleted, index file generator 1812 adds/removes a corresponding entry in index file 1815. In one embodiment, index file 1815 includes bookmark entries comprising a bookmark number and a reference to the corresponding line in HTML document 1605. Annotation entries similarly contain an annotation number, a reference to the corresponding line in HTML document 1605, as well as a reference to the respective audio annotation file.

Index file generator 1812 may also generate an HTML index file 1816 or other form of displayable navigation index. For example, index generator 1812 may provide an HTML navigation index based on the entries from index file 1815. Entries in the navigation index may include, for example, an annotation entry comprising an annotation number (e.g., consecutively assigned when annotation is created), a link to the corresponding audio annotation file, and a link to the respective line in HTML document 1605. Bookmark entries in the HTML navigation index may comprise a bookmark number or identifier and a link to the corresponding line in HTML document 1605. In one embodiment, selection of an annotation scrolls the display to the line associated with the annotation and may initiate playback of the audio annotation file (or wait for a user command to do so). Selection of a bookmark scrolls the display to the associated line of text from HTML document 1605, and may begin playback of the associated audio data (e.g., using map file 1504 or data 1505 to determine the appropriate audio time code from the given line ID; the index entry may also include an audio link with the corresponding time code).

Annotation device 1801 may also provide a "save" command that causes the links in index file 1816 to be written into HTML document 1605 at the beginning of the respective lines of text. When displayed, those links may be represented, for example, by respective annotation and bookmark icons. Generation of index file 1816 and updating of HTML document 1605 may alternatively be performed after the annotation session, e.g., when the files from memory 1800 have been transmitted to a computer system with greater processing and memory resources and/or more display capacity (e.g., to support a separate navigation index window).

Figure 19:
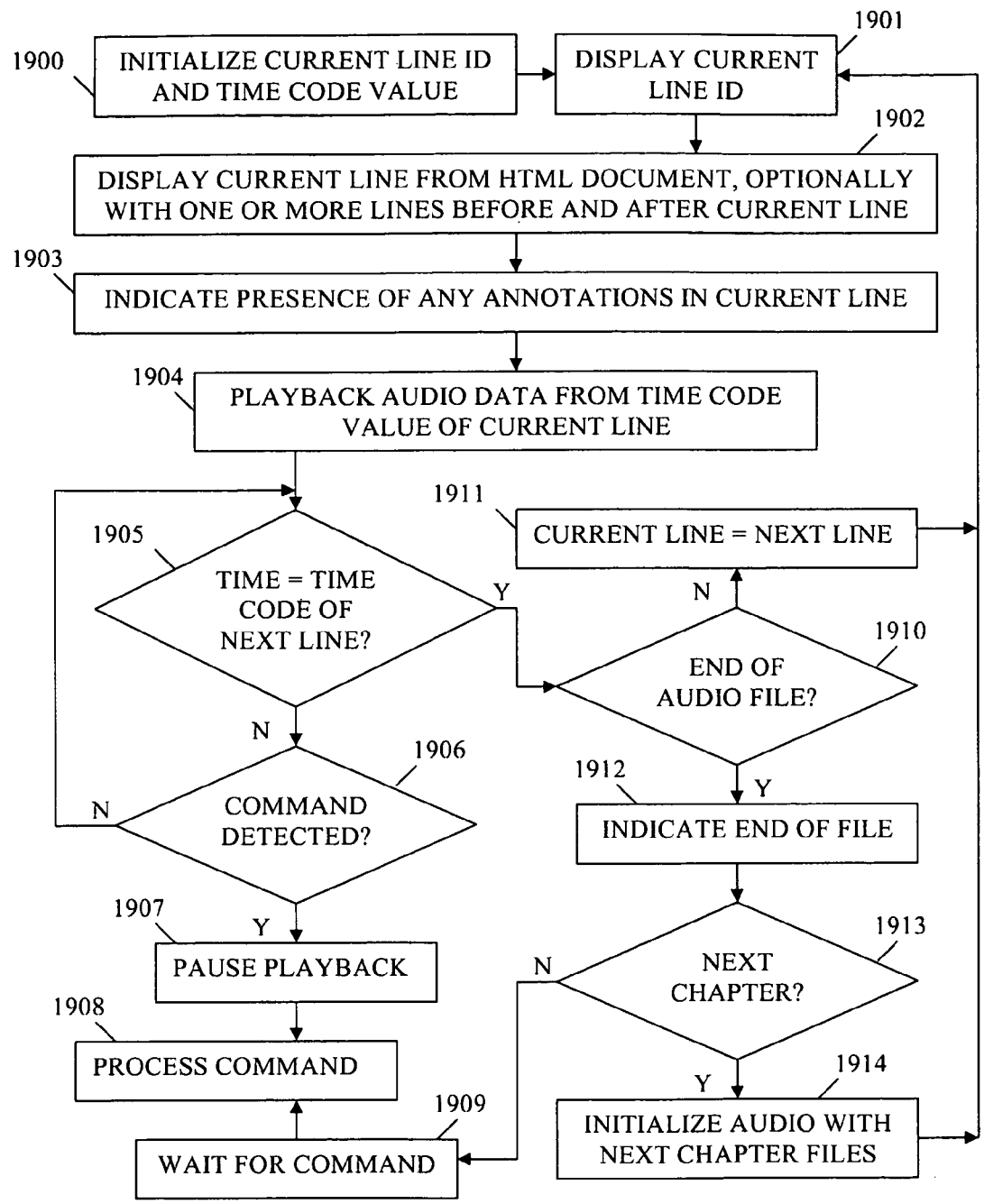
FIG. 19 is a flow diagram of a method for annotating a document presented as an audio file in accordance with one or more embodiments of the invention.

FIG. 19 is a flow diagram of a method for annotating line-based documents, in accordance with one or more embodiments of the invention. In block 1900, in the navigation state of the annotation device, a current line ID value and an audio index timer are initialized (e.g., line ID=1 and time code=0:0:0:0). Assuming the device embodiment includes a display, in block 1901, the annotation device displays the current line ID. In block 1902, the annotation device displays the current line of text from the line-based document (e.g., 1605). Additional lines or portions of lines before and after the current line may also be shown for visual context. If any annotations and/or bookmarks are associated with the current line (e.g., as determined from the HTML document and/or the annotation/bookmark index file), the annotation device may indicate the presence of those annotations/bookmarks visually and/or audibly in block 1903. In block 1904, the audio data is played back based on the current time code value.

Though blocks 1901-1904 are shown in serial fashion, it will be understood that the functions of those blocks may occur, at least in part, simultaneously, or in a different order than shown.

In block 1905, if the audio index timer (which is incremented as each audio sample/frame is played) has reached the time code value associated with the line identifier of the next line of the document, the method proceeds to block 1910; otherwise, the method proceeds to block 1906. In block 1906, if no command (manual or audible) is detected, playback continues and the method returns to block 1905. If, however, a command is detected in block 1906, then playback is optionally paused in block 1907, and the command is processed in block 1908. If the command is a navigation-related command, the method will return to block 1900 (after 1908), where the navigation state will be re-initialized to the line ID specified by the command and the corresponding audio time code value (as obtained from map 1504 or line ID-time code data 1505). If the command is not navigation related, playback may resume after completion of the command (e.g., returning to block 1905).

In block 1910, if the audio data has not reached the end of the file, then in block 1911, the current line ID value is incremented to the next line ID value and the method returns to block 1901.

If, in block 1910, the audio data is at the end of the file, then in block 1912, the annotation device may notify the user visually and/or audibly that the document or chapter/section is complete. If, in block 1913, there is no subsequent chapter/section, then the annotation device may wait for a user command in block 1909, as shown, or the annotation device may take a default or user preference-based action (e.g., return to beginning of document or menu state). If, in block 1913, a subsequent chapter (as represented by a separate audio file) is resident in memory, then in block 1914, the annotation device may initialize the audio playback functions (e.g., audio codec) with the subsequent chapter/section audio file before returning to block 1901.

Figure 20A:
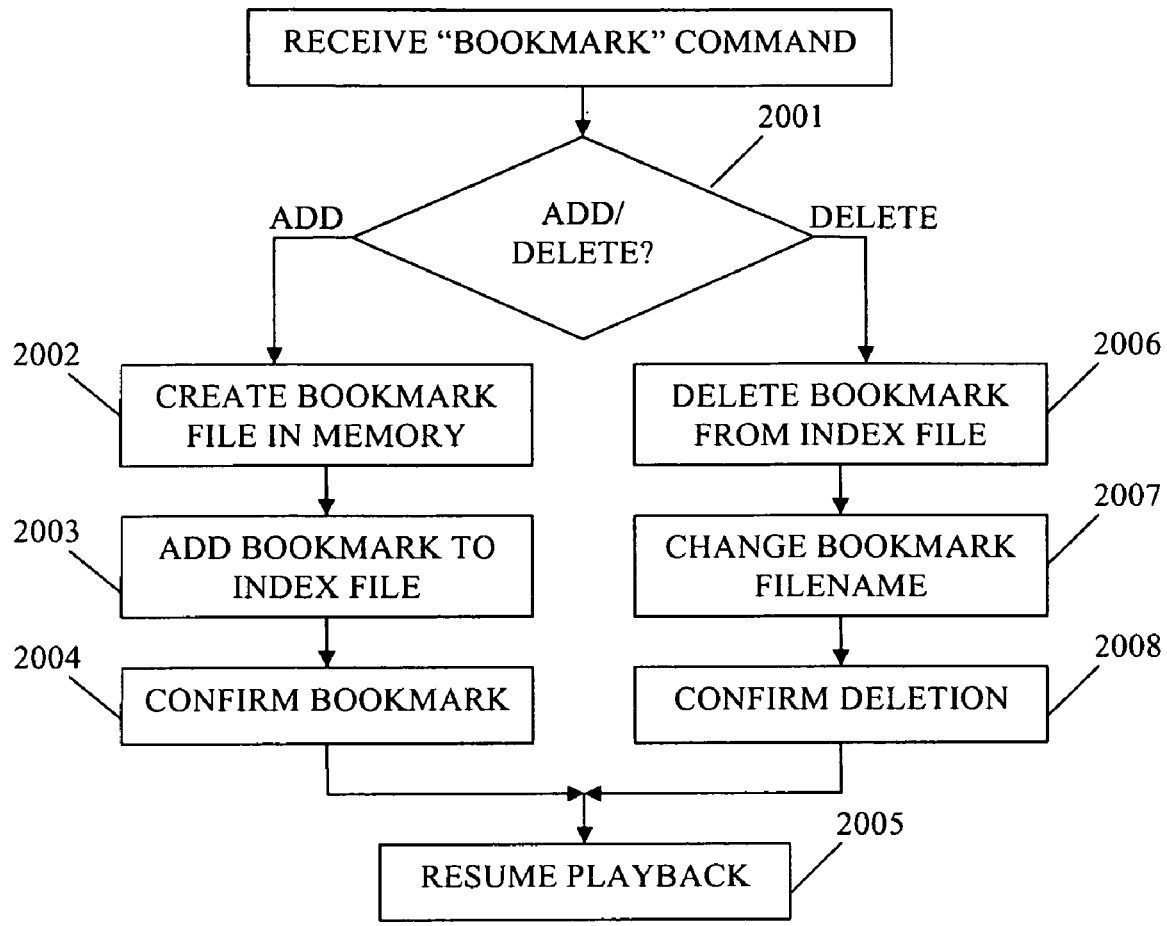
FIG. 20A is a flow diagram of a method for processing a received bookmark creation/deletion command in an annotation device, in accordance with one or more embodiments of the invention.
Figure 20B:
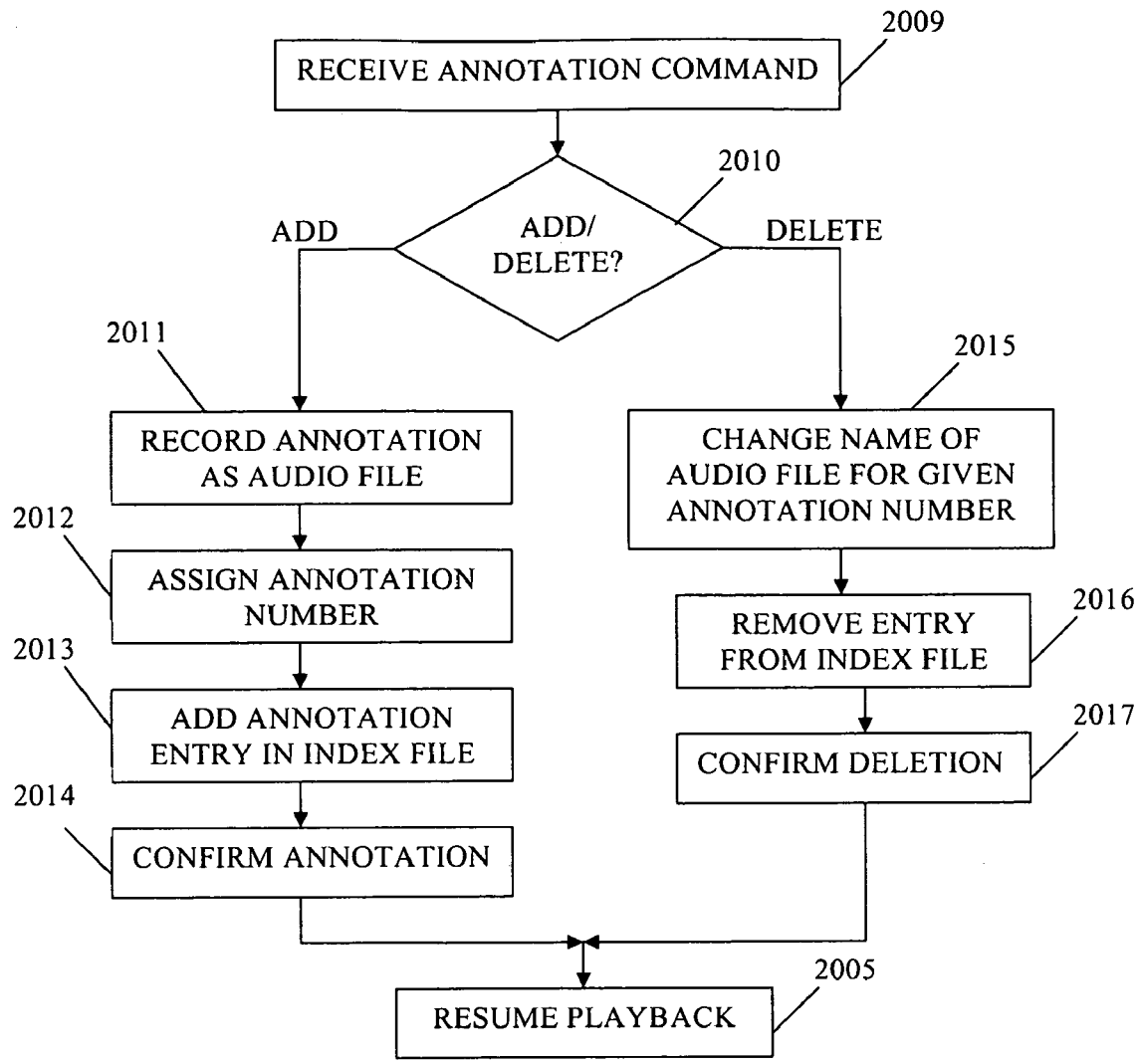
FIG. 20B is a flow diagram of a method for processing a received annotation creation/deletion command in an annotation device, in accordance with one or more embodiments of the invention.
Figure 20C:
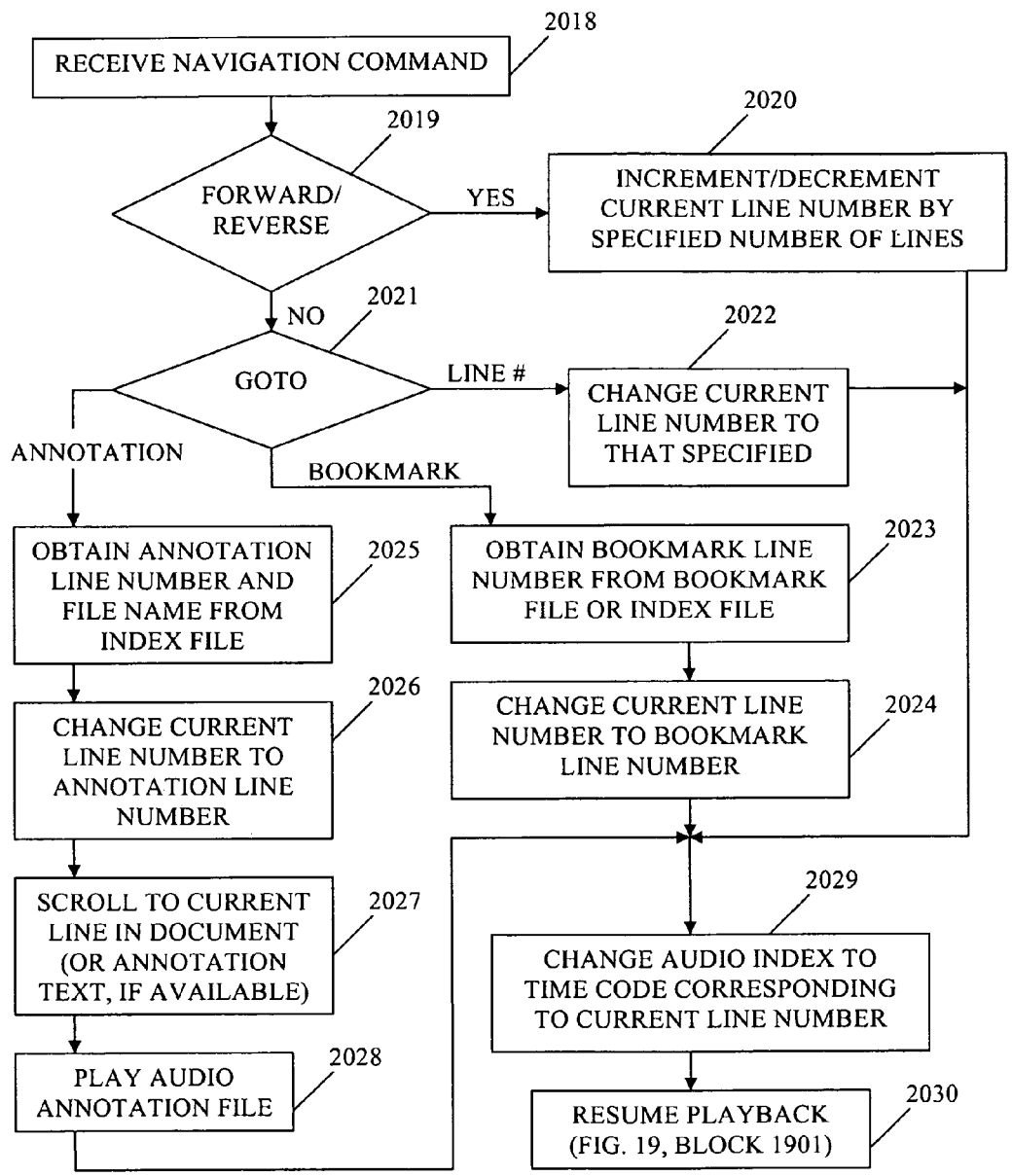
FIG. 20C is a flow diagram of a method for processing received audible navigation commands in an annotation device, in accordance with one or more embodiments of the invention.

FIGS. 20A-20C are flow diagrams representing example embodiments of methods for processing bookmark, annotation and navigation commands, respectively, as might be processed in block 1908 of FIG. 19, for example.

FIG. 20A illustrates one embodiment for processing a received bookmark creation/deletion command in an annotation device. In block 2000, the bookmark command is received, e.g., detected by voice recognition hardware/software. In block 2001, if the command is to add a bookmark, the method continues at block 2002; otherwise, the method proceeds to block 2006.

In block 2002, a bookmark file is created in memory (or, in some embodiments, a bookmark entry is added to a chapter or global bookmark file). The bookmark file may include, for example, the line identifier of the current line under review/playback. If a line number is specified in the command, the specified line number, rather than the current line number, may be recorded in the bookmark file. A bookmark number (e.g., sequentially assigned) or other identifier may be assigned to the bookmark. In block 2003, a bookmark entry may be added to the index file (e.g., 1815). In block 2004, a confirmation message or indicator may be visually and/or audibly presented to the user (e.g., an audible message stating "Bookmark number <#> has been assigned to line number <#>."). In block 2005, regular audio playback may resume.

In block 2006, the bookmark specified in the command is deleted from the index file (1815). In block 2007, the filename of the existing bookmark file may be modified (e.g., by appending "DEL" to the filename) to indicate the bookmark's deleted status. This name change procedure permits "undelete" operations to be implemented for erroneously deleted bookmarks. Alternatively, the bookmark file may be itself be deleted. In block 2008, a confirmation message or indicator may be visually and/or audibly presented to the user. The method may then proceed to block 2005.

FIG. 20B illustrates one embodiment for processing a received annotation creation/deletion command in an annotation device. In block 2009, the annotation command is received, e.g., detected by voice recognition hardware/software. In block 2010, if the command is to add an annotation, the method continues at block 2011; otherwise, the method proceeds to block 2015.

In block 2011, an annotation file is created in memory (or, in some embodiments, an annotation entry is added to a chapter or global annotation file), in which the captured audio annotation is written as audio data. The annotation file may also include, as part of the title for example, the line identifier of the current line under review/playback and the annotation number/identifier assigned to the new annotation (block 2012). Additional information, such as the name of the annotator, the time and date of annotation, a specified annotation topic or type, etc., may also be captured and recorded at the time the annotation is created.

In block 2013, an annotation entry may be added to the index file (e.g., 1815). In block 2014, a confirmation message or indicator may be visually and/or audibly presented to the user (e.g., an audible message stating "Annotation number <#> attached to line number <#>."). The user may also be given the opportunity to review and edit his annotation. In block 2005, regular audio playback may resume.

In block 2015, the annotation specified in the command is deleted from the index file (1815). In block 2016, the filename of the existing annotation file may be modified (e.g., by appending "DEL" to the filename) to indicate the annotation's deleted status. In block 2017, a confirmation message or indicator may be visually and/or audibly presented to the user. The user may be given the opportunity to confirm the deletion (at which time the annotation file may optionally be deleted) before regular processing resumes in block 2005.

The deleted annotations may be searched and/or indexed using the modified annotation filenames. The deleted annotations may also be "undeleted" at any time by renaming a respective annotation file (e.g., by removing the appended "DEL") and adding an entry into the index file. A command may be provided for triggering a purge (i.e., actual file deletion) of deleted annotations.

FIG. 20C illustrates one embodiment for processing received audible navigation commands in an annotation device. In block 2018, the navigation command is received, e.g., detected by voice recognition hardware/software. In block 2019, if the command is a "forward" or "reverse" (also, "back") command, then in block 2020, the current line number/identifier is incremented (forward) or decremented (reverse) by the number of lines specified in the command. If no number of lines were specified, the system may move forward or backward by a pre-defined number of lines (e.g., user-configured or default number value). Block 2022 then proceeds to block 2029.

Though not shown, similar "forward" and "back" commands may be used to move forward and backward within the existing annotations or bookmarks. In that case, the annotation number or bookmark number would be incremented or decremented, and the line number of the resulting annotation or bookmark entry would become the current line number for the navigation state in navigator 1806.

In block 2019, if the command is not a "forward" or "reverse" (or "back") command, then the process continues at block 2021. Block 2021 proceeds to block 2022, block 2023 or block 2025, based on whether the command is a line number "goto" command, a bookmark "goto" command or an annotation "goto" command, respectively. For a line-number goto command, in block 2022, the current line number state is adjusted to reflect the line number specified in the command. From block 2022, the process continues at block 2029.

For a bookmark goto command, in block 2023, the specified bookmark number/identifier is used to obtain a corresponding line number from the index file or the corresponding bookmark file. Then, in block 2024, the obtained line number is set as the current line number for the navigation state, and the process continues to block 2029.

For an annotation goto command, in block 2025, the specified annotation number/identifier is used to obtain a corresponding annotation line number and annotation file name from the index file. In block 2026, the obtained annotation line number is set as the current line number in the navigation state, and, in block 2027, the browser scrolls to the annotation line number of the displayed document. The browser may also display annotation text, if available. In block 2028, the annotation device may begin playback of the specified audio annotation file or present an interface for the user to control playback of the annotation audio. After block, 2028, the process continues at block 2029.

In block 2029, the audio index for the main document audio file is updated to reflect the time code corresponding to the current line number (as modified by the processed command). In block 2030, the process resumes playback of the document audio, e.g., by returning to block 1901 of FIG. 19.

Though not shown in FIGS. 20A-20C, detection of a voice (or manual) command to switch playback speeds may be accomplished in one or more embodiments by accessing the pre-generated audio file corresponding to the requested playback speed level (e.g., either in relative terms of "slower" and "faster", or in explicit terms such as "slow", "normal" and "fast"). The current time code value may be used to continue playback from the newly selected audio file at the same location with respect to the line-based document.

Figure 21A:
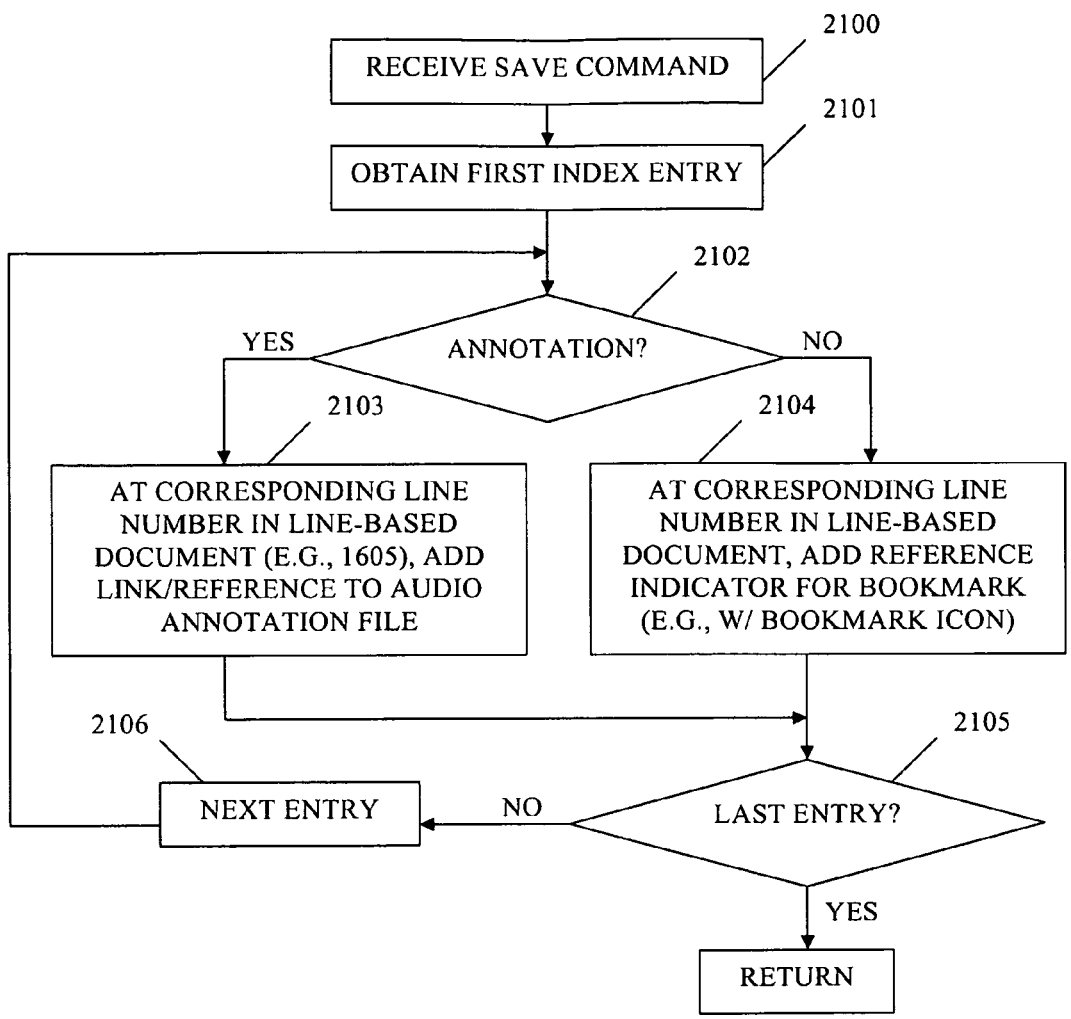
FIG. 21A is a flow diagram of a process for incorporating annotation and bookmark links using an index file, in accordance with one or more embodiments of the invention.

In one or more embodiments, the annotation device may be configured with a "save" command to trigger the incorporation/embedding of annotation links/icons and bookmark icons (reference points) into the HTML document 1605. FIG. 21A illustrates one embodiment of a process for incorporating annotation and bookmark links, using an index file (e.g., 1815). In block 2100, the "save" command is received via voice recognition or manual input. In block 2101, the first entry in the index file is read. If in block 2102, the index entry is an annotation entry, the process continues at block 2103; otherwise, the process continues at block 2104.

In block 2103, the line number specified in the first index entry is used to access the corresponding line in HTML document 1605. A reference or link to the corresponding audio annotation file, as specified in the index entry, is created in the HTML document, e.g., as an annotation icon positioned at the beginning of the text line or at some other position associated with that line (e.g., in the margin). From block 2103, the process continues at block 2105, where, if the processed index entry is last entry in the index, the process returns from the "save" function. If in block 2105, the index entry is not the last entry, the next entry is read at block 2106, and the process returns to block 2102.

If, in block 2102, the current index entry is a bookmark entry, then, in block 2104, the line number specified in the bookmark entry is used to access the corresponding line of HTML document 1605. A bookmark icon (representing a bookmark link/reference point) may then be placed at the beginning of the line (or other associated location) in HTML document 1605.

Optionally, the embedded annotation and bookmark links may be configured to display information about the creator of the annotation/bookmark and when the annotation/bookmark was created. Such information might be displayed, for example, when a user passes a mouse pointer or other selection indicator across the respective annotation/bookmark icon.

The "save" command process may also be used to generate an HTML navigation index 1816, in one or more embodiments of the invention. For example, at block 2103, when the save function is embedding an annotation link into the HTML document 1605, the save function may also write an HTML annotation entry into navigation index 1816. Likewise, at block 2104, the save function may also write an HTML bookmark entry in navigation index 1816. An example embodiment of such an HTML navigation index is described later with reference to FIG. 24.

While the foregoing save function may be implemented within annotation device 1801, the same function may additionally, or alternatively, be implemented by another computer system after the files in memory 1800 are transferred to such a computer system (e.g., after the reviewer has completed, for the time being, the annotation process). This other computer system may or may not be the same computer system in which the audio file generator 1601 is implemented.

Figure 21B:
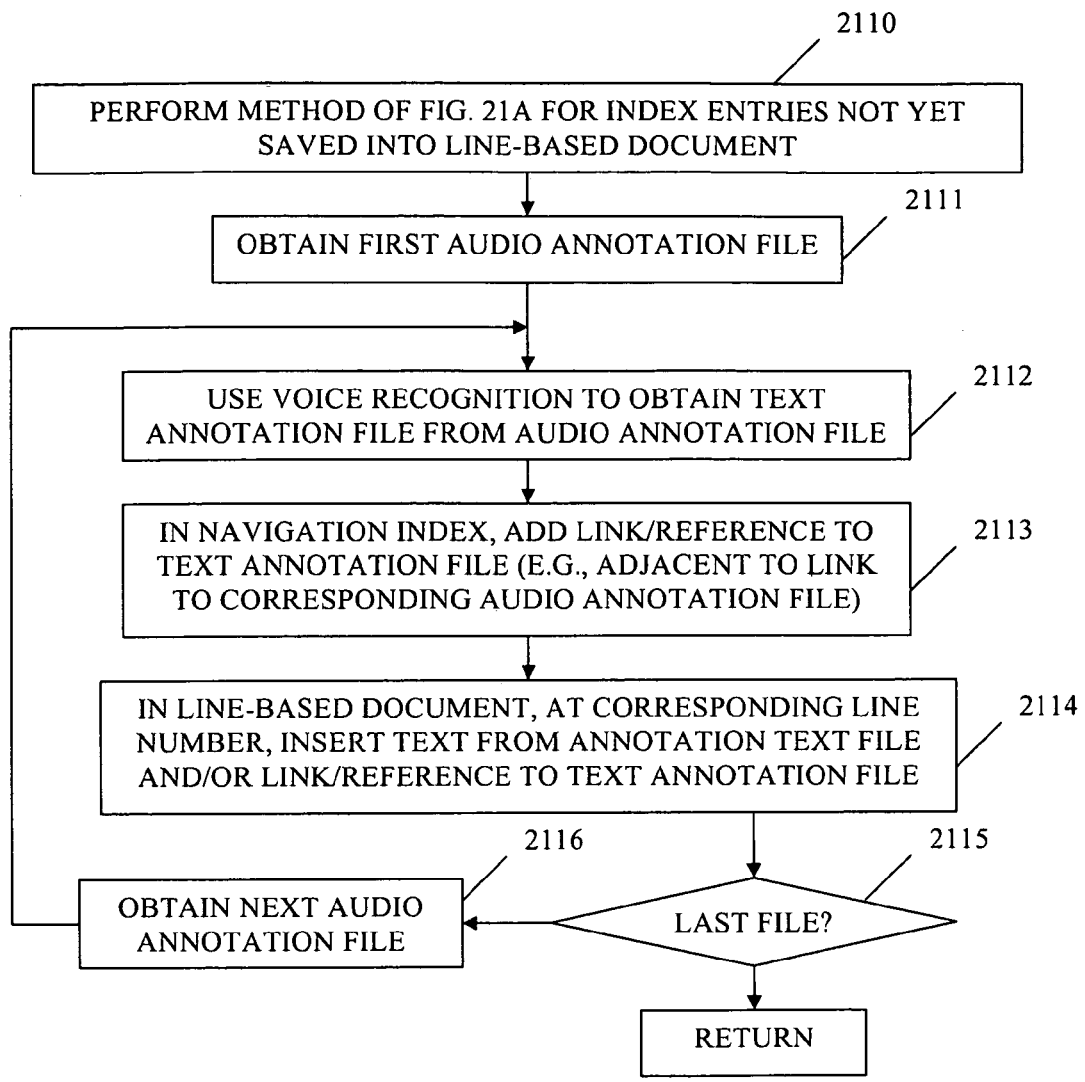
FIG. 21B is a flow diagram of an example embodiment of annotation post-processing, in accordance with one or more embodiments of the invention.

In one or more embodiments, the destination computer system platform is configured with sufficient computing resources to perform general speech recognition. As such, post-processing functions may be implemented to obtain text files from the audio annotation files. By implementing this general speech recognition on a computer system other than the annotation device itself, the annotation device is permitted to use a less intensive voice recognition algorithm with a limited library (e.g., numbers and a finite set of voice commands). FIG. 21B illustrates an example embodiment of annotation post-processing, in accordance with one or more embodiments of the invention.

In block 2110 of FIG. 21B, if the process of FIG. 21A has not yet been performed for one or more index entries, that process is performed. In block 2111, the first audio annotation file is obtained (e.g., by directory search for annotation filenames or using an entry from index 1815 or 1816). In block 2112, speech recognition is applied to obtain a corresponding annotation text file from the audio annotation file. (Naming conventions for annotation text files may be as described previously for audio annotation files, for example.)

In step 2113, a link/reference to the annotation text file is written into the HTML navigation index 1816, e.g., adjacent to the corresponding audio annotation link. In step 2114, the annotation text and/or a link or reference to the annotation text file may be embedded in the HTML document 1605 at the respective document line number. In one embodiment, audio and text-related icons are used to distinguish between audio annotation links and text annotation links. If more audio annotation files remain to convert in block 2115, then in block 2116, the next audio annotation file is obtained and the process returns to block 2112.

Figure 22:
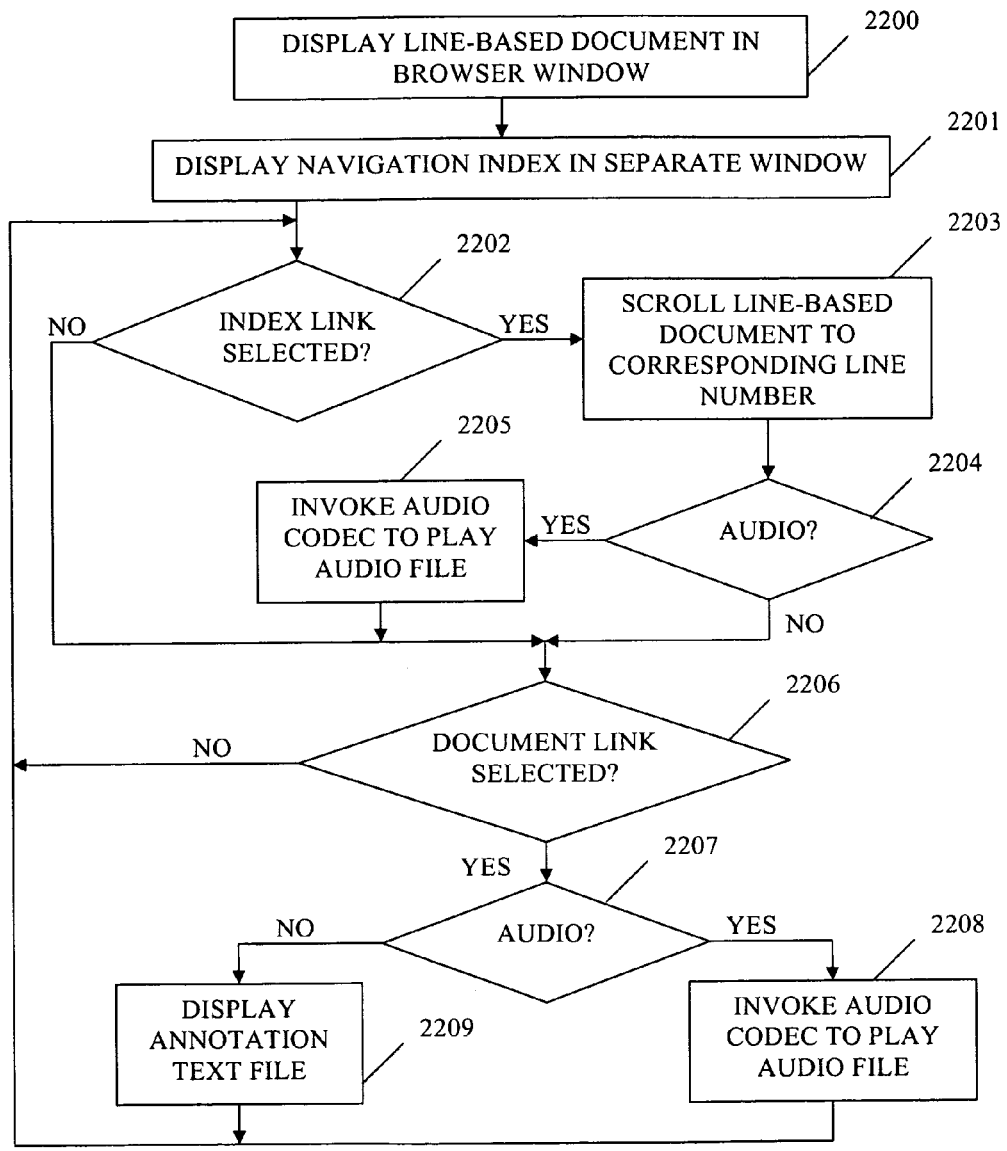
FIG. 22 is a flow diagram of an example browser navigation process in accordance with one or more embodiments of the invention.

In one or more embodiments of the invention, the annotated document is capable of being reviewed in a simple browser application or any other application capable of rendering the mark-up language format of the final text document. FIG. 22 illustrates an example browser navigation process in accordance with one or more embodiments.

In block 2200 of FIG. 22, the line-based document (e.g., HTML document 1605) is displayed in a first window of a browser, reader, word processing application, or other document viewing application. In block 2201, e.g., in a menu or second window, a clickable navigation index is presented. In block 2202, if a link or reference is selected from the navigation index, then in block 2203, the viewing application processes the link to present the designated line of the line-based document in the first window (e.g., by scrolling to the location of the line number).

At block 2204, if the selected link is a link to an audio annotation file, then an audio codec (or other media player software) is invoked in block 2205 to play the audio file indicated in the link. The audio codec may play automatically, or the media player software may present an audio player interface to the user, so that the user may control the playback. Though not specifically shown in FIG. 22, if in block 2204, the link is directed to a text annotation file, some embodiments may display the text of the annotation in a pop-up window or another text region of the first window. Alternatively, the annotation text may be viewable within the line-based document itself (e.g., below the referenced line number). The links may also be configured to display annotation text or information about the annotation (e.g., the name of the annotator and the date of the annotation), when the user moves a cursor over a given link.

In block 2206, if a link in the line-based document is selected (e.g., an audio annotation file link or a text annotation link), the method continues to block 2207. If, in block 2207, the link is to an audio annotation file, then in block 2208, the audio codec is invoked to play the specified audio annotation file. Otherwise, if the link is directed to a text annotation file, the text of the annotation is presented to the viewer in block 2209 (e.g., in a pop-up window or separate portion of the first window, etc.).

Figure 24:
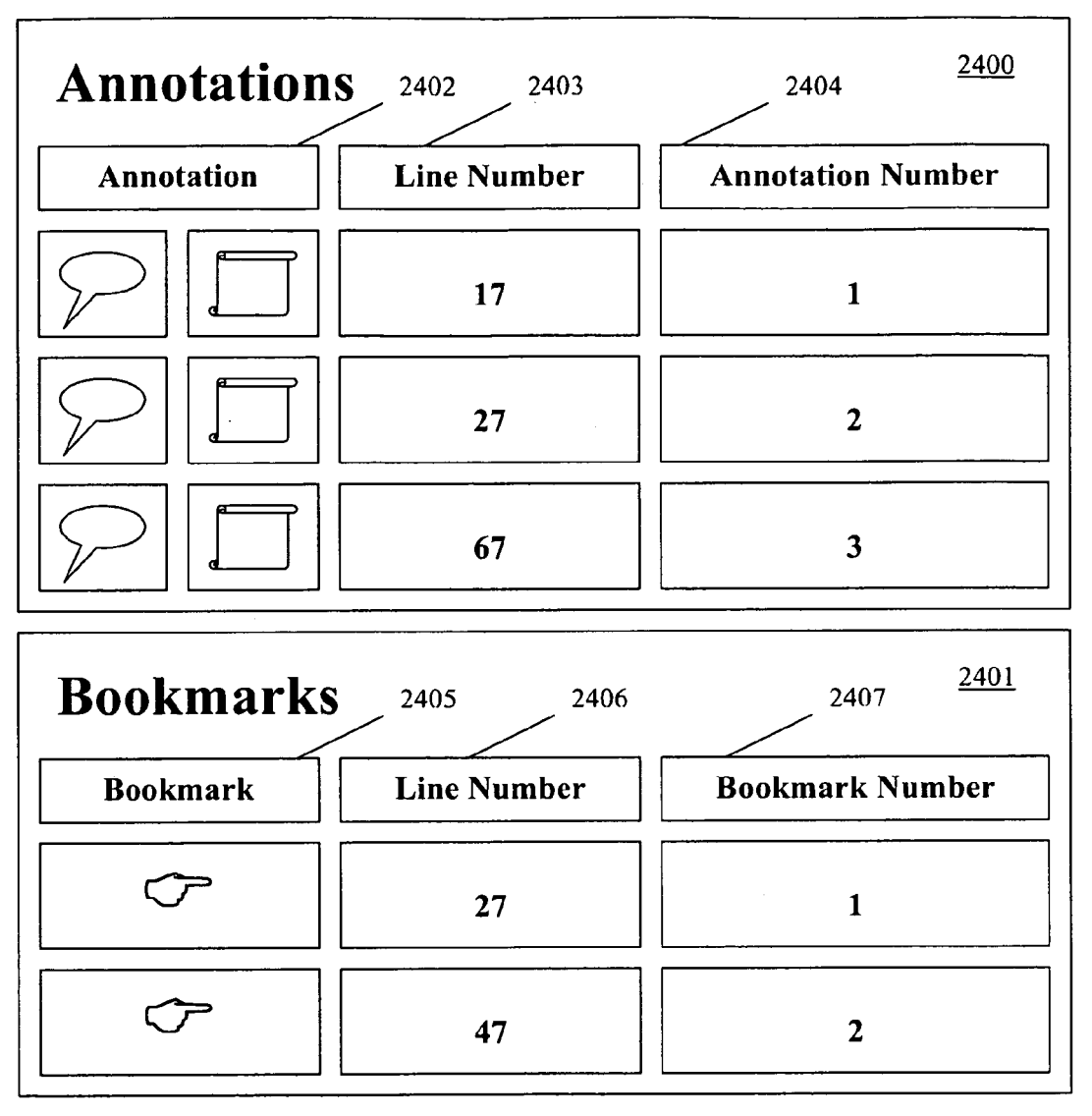

FIG. 24 illustrates an example embodiment of a navigation index window including an annotation index 2400 and a bookmark index 2401. As shown, annotation index 2400 comprises an annotation icon column 2402, in which a link icon to an audio annotation file and/or a link icon to a text annotation file are presented. The link icons may be chosen to graphically indicate the type of annotation file the link icon is associated with. For example, the link icon for a audio annotation file might be a conversation bubble as shown, and the link icon for a text annotation file might be a parchment icon or other graphic representation indicating written text. Annotation index 2400 also includes column 2403 indicating the associated line number in the line-based document (and may be a link to that line number as well), and column 2404 indicating the annotation number of the particular annotation.

Bookmark index 2401, as shown, comprises a first column 2405 having link icons to respective bookmarked line numbers in the text-based document. Again, the link icons may be chosen to graphically represent a bookmark or goto function (e.g., pointing finger). Columns 2406 and 2407 display the associated line number and bookmark number, respectively, for a given bookmark. In addition to the elements shown in FIG. 24, "next" and "back" buttons or other control elements may be provided by which a user may select a bookmark or annotation ahead or behind a current selection in the index window based on numerical order, or based on a navigation history.

For large numbers of annotations and/or bookmarks, a search function may be provided to search for annotations or bookmarks based on criteria such as identity of annotator, date range of annotations, etc. Further, the presentation of annotations and bookmarks may be configurable so as to organize the listed annotations or bookmarks by annotator, date of annotation, annotation topic, etc.

Other embodiments may present the above elements in a different arrangement, and may also present additional elements (e.g., information about the annotator or a link to such information. Also, annotations and bookmarks may reside within a single table, or the annotation and bookmark indexes may be presented in separate windows or separate portions of a window.

As described above, the user may browse through the line-based document and the annotations, whether audio or text, using either the line-based document itself, with its internal links to annotations, or using the navigation index window with its readily accessible links to all of the annotations (and bookmarks).

Figure 23:
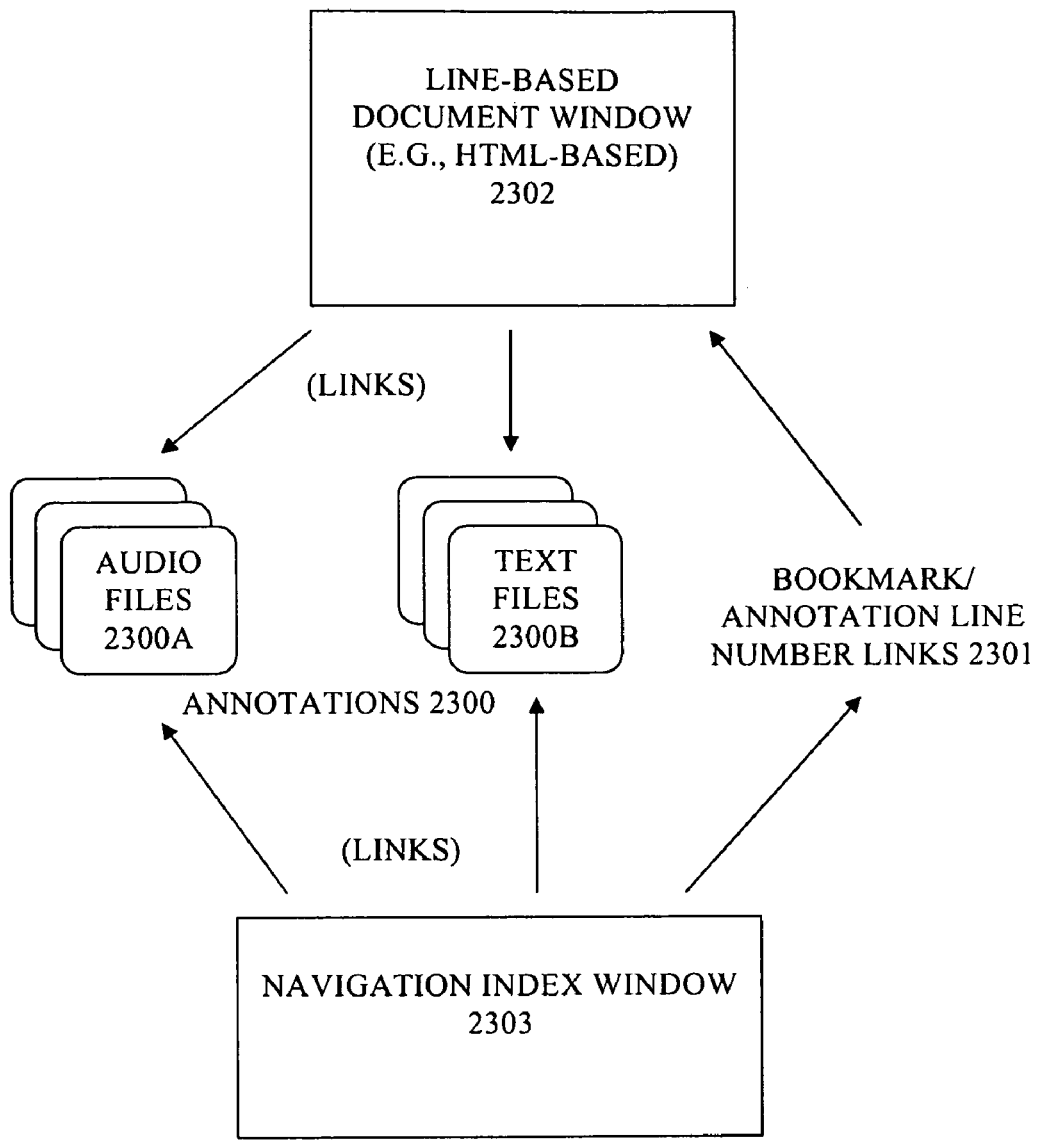
FIG. 23 is a block diagram illustrating the links presented in the line-based document window and the navigation index window in accordance with one or more embodiments of the invention.

FIG. 23 is a block diagram illustrating the links presented in the line-based document window and the navigation index window in accordance with one or more embodiments of the invention. FIG. 23 includes line-based document window 2302, navigation index window 2303, audio files 2300A and text files 2300B (representing annotations 2300). From the line-based document window 2302, the user can activate links to audio files 2300A or text files 2300B (e.g., as link icons displayed with the associated line number in the line-based text document).

Navigation index window 2303 provides similar links to audio files 2300A and text files 2300B (e.g., as a link table). Annotation links (audio and text) in navigation index window 2303 also identify the respective line number for each annotation so that line-based document window 2302 is scrolled to the appropriate line number when a link is selected. Additionally, navigation index window provides bookmark links for the user to scroll line-based document window 2302 directly to a bookmarked line number.

Thus, a method and apparatus for annotating a document have been described. Particular embodiments described herein are illustrative only and should not limit the present invention thereby. The claims and their full scope of equivalents define the invention.

The invention claimed is:

1. An apparatus for annotating a line-based document, wherein said line-based document comprises audio data, said apparatus comprising:
   a processor coupled to a communications bus;
   an audio output device coupled to said communications bus;
   an audio input device coupled to said communications bus;
   a memory coupled to said communications bus, said memory comprising computer readable instructions for causing said processor to perform the functions of:
   an audio codec function for generating audio signals to be output by said audio output device;
   a voice recognition function for receiving audio signals from said audio input device, said voice recognition function configured to detect one or more audible document navigation commands and one or more audible annotation commands;
   a navigation function responsive to a detected document navigation command received from said voice recognition function, said detected document navigation command comprising a desired line identifier, said navigation function configured to determine a desired audio time code associated with said desired line identifier and to direct said audio codec function to play back said audio data from said desired audio time code;
   an annotation function responsive to a detected annotation command received from said voice recognition function, said annotation function configured to capture an audible annotation via said audio input device and to store said audible annotation as an audio annotation file; and an index generator configured to add to an index file an annotation link having a first reference to said audio annotation file and a second reference to an associated line of said line-based document.

2. The apparatus of claim 1, wherein said navigation function is configured to track a current line number from a current time code of said audio data.

3. The apparatus of claim 2, wherein said index generator is configured to obtain said current line number to provide said second reference.

4. The apparatus of claim 2, further comprising:
   a display coupled to said communications bus; and
   a browser configured to render hypertext data associated with said line-based document, said browser configured to render said hypertext data to said display.

5. The apparatus of claim 4, wherein said navigation function is configured to update said browser with said current line number as said audio codec function plays back said audio data.

6. The apparatus of claim 2, further comprising:
a bookmark function responsive to a detected bookmark command received from said voice recognition function by storing said current line number as a bookmark line number.

7. The apparatus of claim 6, wherein said index generator is further configured to add to said index file a bookmark link having a third reference to said bookmark line number.

8. The apparatus of claim 1, wherein said navigation function is configured to access a map associated with said line-based document, said map associating a plurality of line identifiers with a plurality of time codes.

9. The apparatus of claim 1, wherein said navigation function is configured to access a data channel associated with said audio data, said data channel comprising a plurality of line identifiers.

10. The apparatus of claim 9, wherein said data channel further comprises audio time codes.

11. A method for annotating a line-based document comprising:
obtaining an audio data file comprising audio data of an audio representation of said line-based document, a plurality of audio time codes and a plurality of line identifiers associated with said plurality of audio time codes;
detecting an audible document navigation command having a specified line identifier, and navigating to a desired position of said audio data based on said specified line identifier;
detecting an audible annotation command during playback of a first line number, and capturing a corresponding audible annotation as an audio annotation file; and
adding an annotation entry to an index file, said annotation entry comprising a first reference to said audio annotation file and a second reference to said first line number.

12. The method of claim 11, further comprising:
detecting an audible bookmark command;
obtaining from said audio data file a current line identifier associated with the playback of said audio data when said audible bookmark command is detected; and
adding a bookmark entry in said index file, said bookmark entry comprising a third reference to said current line identifier.

13. The method of claim 11, further comprising:
detecting a speed command to change playback speed;
accessing a second audio data file corresponding to a target speed associated with said speed command, said second audio file being pre-generated by a text-to-speech converter at said target playback speed; and
playing back said second audio data file from a location corresponding to a most recent time code value.

14. The method of claim 11, further comprising using said index file to append one or more annotation links to one or more respective lines of a text-based version of said line-based document.

15. The method of claim 11, further comprising:
using voice recognition to generate one or more annotation text files corresponding to one or more respective audio annotation files.

16. The method of claim 15, further comprising:
providing a hypertext navigation document comprising links to said annotation text files and to said respective audio annotation files.

17. The method of claim 16, further comprising:
providing one or more bookmark links in said hypertext navigation document.

18. The method of claim 11, wherein obtaining said audio data file comprises:
obtaining a hypertext document comprising line numbers;
using a text-to-speech engine to obtain said audio data file, wherein said text-to-speech engine records line identifiers in association with time codes of said audio data file.

19. The method of claim 18, further comprising:
said text-to-speech engine rendering audio data for each line of said hypertext document based on one or more line-specific voice assignments.

20. The method of claim 19, wherein said line-specific voice assignments are embodied in one or more style settings of a word processing application.

21. A method for annotating a line-based document comprising:
in a first computer system, pre-processing a line-based document to obtain an audio data file comprising audio data, a plurality of time codes and a plurality of line identifiers associated with said plurality of time codes;
providing said audio data file to a portable annotation device;
in said portable annotation device,
in response to line-based voice commands, navigating audio playback within said audio data file using said plurality of line identifiers in said audio data file;
in response to audible annotation commands, capturing an audio annotation file for each new user annotation, and providing an annotation entry in an index file, wherein said annotation entry comprises a first reference to a respective audio annotation file and a second reference to a line identifier in said audio data file;
providing a plurality of said annotation files and said index file to said first computer system;
in said first computer system,
using voice recognition to obtain a plurality of annotation text files corresponding to said plurality of annotation files;
for each annotation entry in said index file, appending to a corresponding line number in said line-based document one or more links to respective audio annotation files and corresponding annotation text files; and
providing a graphical navigation window comprising a plurality of links to said plurality of audio annotation files, a plurality of links to said annotation text files, and a plurality of links to line numbers in said line-based document.

22. An apparatus for providing a line-based audio data file comprising:
a processor coupled to a communications bus;
a memory coupled to said communications bus, said memory comprising computer readable instructions for causing said processor to perform the functions of:
a text-to-speech converter configured to generate one or more audio data files from a line-based text document, said audio data files each comprising one or more channels of audio data and a parallel data channel comprising a plurality of audio time codes; and
a line identifier generator configured to obtain a plurality of line numbers from said line-based document and provide a plurality of respective line identifiers in said audio data file, said plurality of line identifiers being associated with said audio time codes.

23. The apparatus of claim 22, wherein said line identifier generator is configured to generate a map associating each of said plurality of line identifiers with a respective audio time code.

24. The apparatus of claim 22, wherein said line identifier generator is configured to add a line data channel to said audio data file in which said plurality of line identifiers are embedded.

25. The apparatus of claim 22, wherein said line identifier generator is configured to embed said plurality of line identifiers within said parallel data channel.

26. The apparatus of claim 22, wherein said computer readable instructions further comprise instructions for causing said processor to perform the functions of a word processing application configured to associate one of a plurality of voices to individual lines within said line-based text document, wherein said text-to-speech converter is configured to use a respectively associated voice when converting each line of said line-based text document.

27. The apparatus of claim 26, wherein said word processing application comprises a plurality of styles by which said plurality of voices may be associated with said lines of said line-based text document.

28. The apparatus of claim 27, wherein said text-to-speech converter is configured to receive a voice preferences file associating one or more of said styles with one or more supported voices.

29. The apparatus of claim 22, wherein said text-to-speech converter is further configured to provide a plurality of sets of audio data corresponding respectively to said text-based document converted at a plurality of playback speeds.

* * * * *